May 5, 1942.  F. Q. RAST  2,281,998

TIME RECORDER

Filed July 7, 1938  15 Sheets-Sheet 1

INVENTOR.
Frederick Q. Rast
BY
W. M. Nelson
ATTORNEY

May 5, 1942.  F. Q. RAST  2,281,998
TIME RECORDER
Filed July 7, 1938  15 Sheets-Sheet 4

INVENTOR
Frederick Q. Rast
BY
ATTORNEY

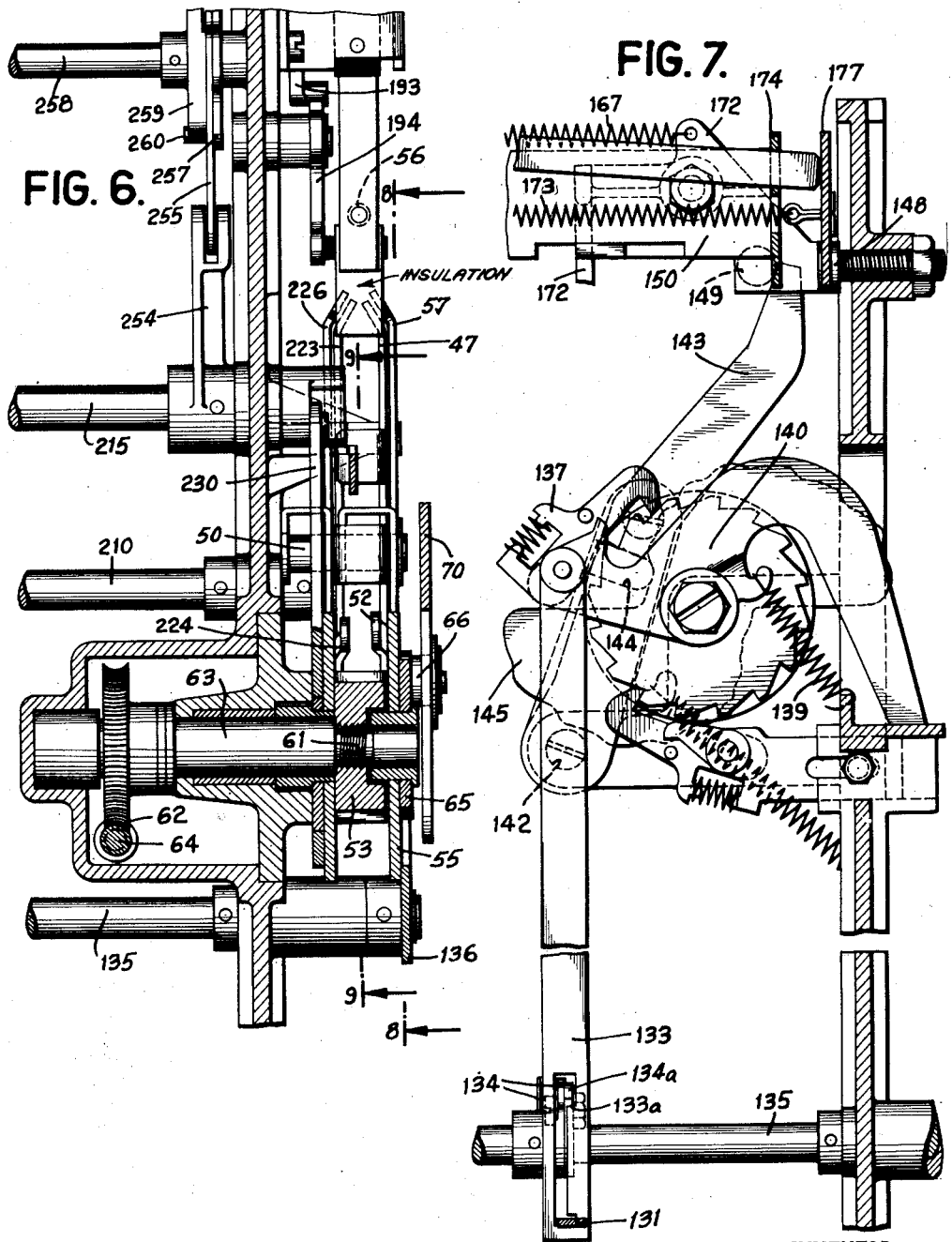

May 5, 1942.   F. Q. RAST   2,281,998
TIME RECORDER
Filed July 7, 1938   15 Sheets-Sheet 6

INVENTOR.
Frederick Q. Rast
BY
ATTORNEY

INVENTOR.
Frederick Q. Rast
BY
ATTORNEY

May 5, 1942.  F. Q. RAST  2,281,998

TIME RECORDER

Filed July 7, 1938  15 Sheets-Sheet 8

INVENTOR.
Frederick Q. Rast
BY
ATTORNEY

May 5, 1942.  F. Q. RAST  2,281,998
TIME RECORDER
Filed July 7, 1938   15 Sheets-Sheet 9

INVENTOR.
Frederick Q. Rast
BY
ATTORNEY

May 5, 1942.  F. Q. RAST  2,281,998
TIME RECORDER
Filed July 7, 1938  15 Sheets-Sheet 10
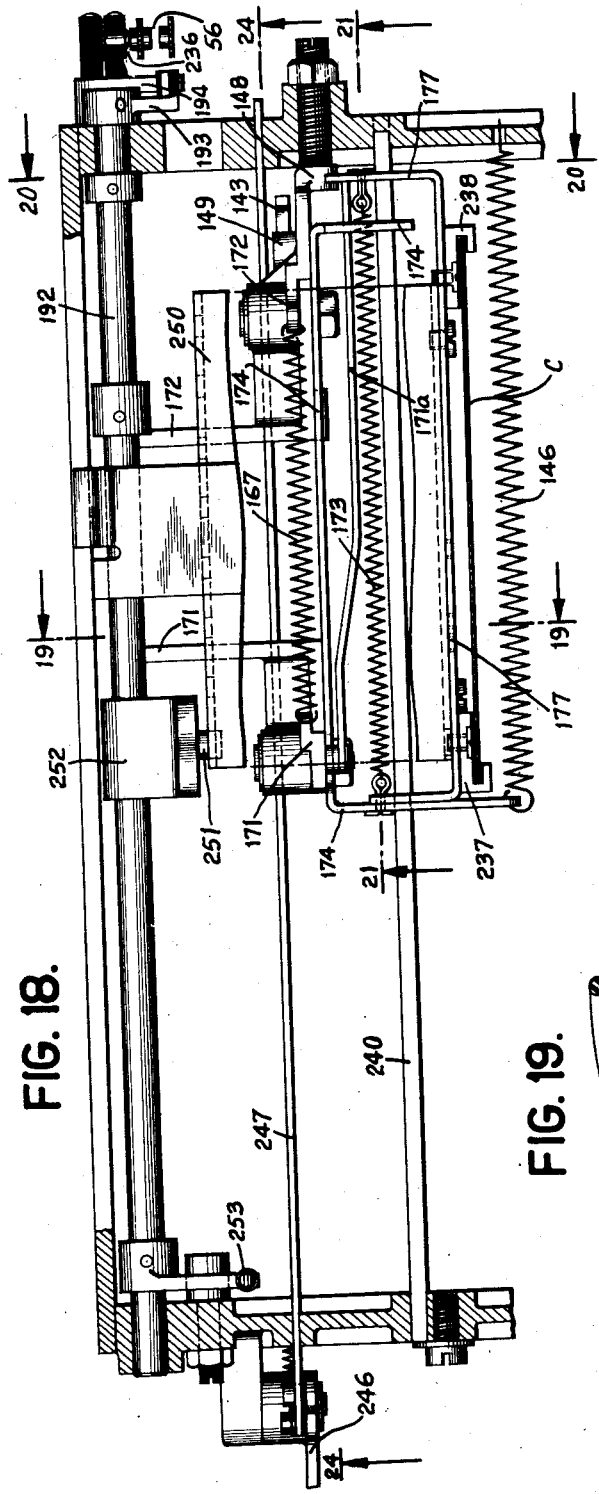
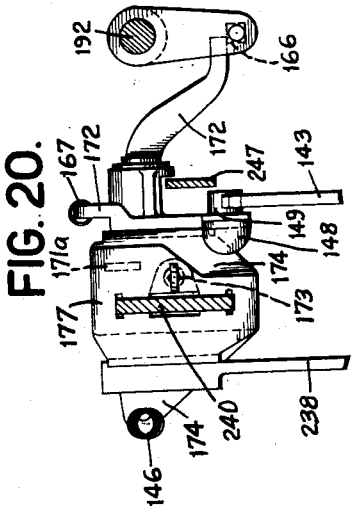
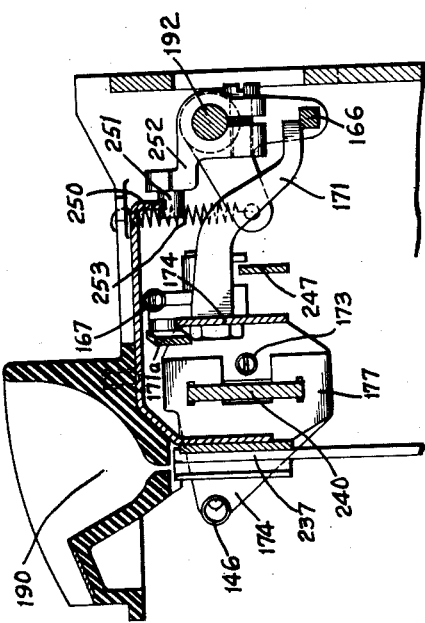
INVENTOR.
Frederick Q. Rast
BY
W. M. ___
ATTORNEY May 5, 1942.  F. Q. RAST  2,281,998
TIME RECORDER
Filed July 7, 1938  15 Sheets-Sheet 11

INVENTOR
Frederick Q. Rast
BY
ATTORNEY

May 5, 1942.  F. Q. RAST  2,281,998
TIME RECORDER
Filed July 7, 1938  15 Sheets-Sheet 12
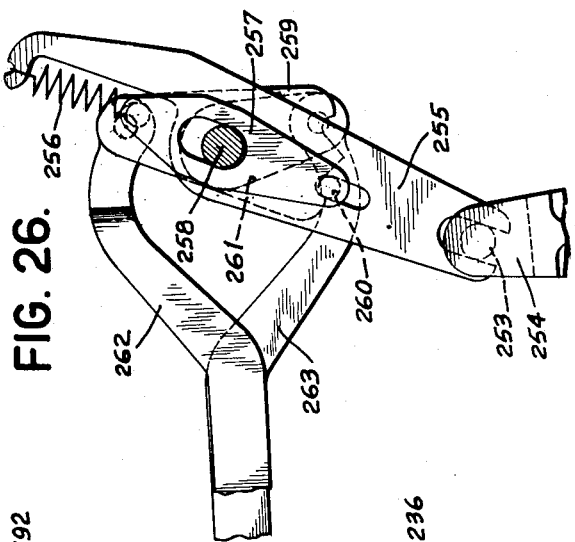
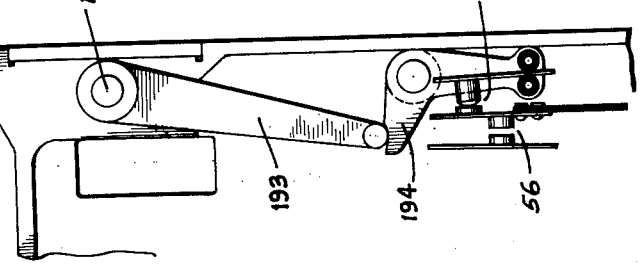
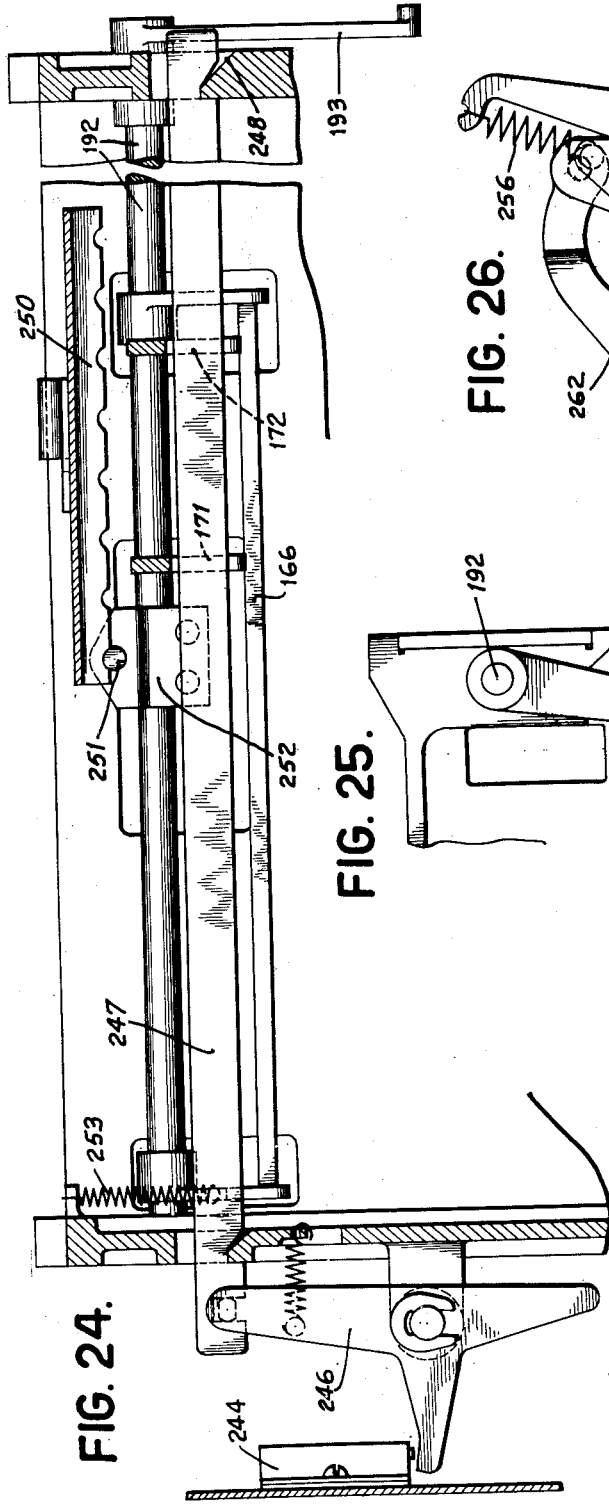
INVENTOR.
Frederick Q. Rast
BY
ATTORNEY May 5, 1942.  F. Q. RAST  2,281,998

TIME RECORDER

Filed July 7, 1938  15 Sheets-Sheet 13

INVENTOR.
Frederick Q. Rast
BY
ATTORNEY

May 5, 1942.　　　F. Q. RAST　　　2,281,998
TIME RECORDER
Filed July 7, 1938　　　15 Sheets-Sheet 14

INVENTOR.
Frederick Q. Rast
BY
ATTORNEY

May 5, 1942.  F. Q. RAST  2,281,998
TIME RECORDER
Filed July 7, 1938  15 Sheets-Sheet 15

INVENTOR.
Frederick Q. Rast
BY
ATTORNEY

Patented May 5, 1942

2,281,998

UNITED STATES PATENT OFFICE 2,281,998

TIME RECORDER

Frederick Q. Rast, Binghamton, N. Y., assignor to International Business Machines Corporation, New York, N. Y., a corporation of New York Application July 7, 1938, Serial No. 217,955

6 Claims. (Cl. 161—1)

This invention relates to time recorders and, particularly, to recorders of the type in which a card is inserted to receive an automatic time registration thereon.

The general object is to provide a novel completely automatic card recorder for automatically making time registrations on an insertible time card.

The object also is to provide such a time recorder as will eliminate the necessity of all manual operations except the operation of inserting the card to receive the registrations.

The object is further to provide a simplified time recorder eliminating parts necessary to prior time recorders without eliminating any of the functions ordinarily effected by time recorders.

It is also contemplated to provide a novel programming mechanism capable of minutely adjusting the card horizontally and vertically to locate a definite registration receiving space thereof in the printing position.

The latter object is further to provide such programming mechanism with means whereby changes in program position of the card may be regulated at minute increments as required or desired.

It is a still further object to provide a programming mechanism which is controlled for a compound movement under control of time means so as to enable the program control elements of said mechanism to be capable of operating at increments of time.

More specifically the latter object includes provision for moving a programming mechanism in diverse directions to progressively locate each control portion thereof in program controlling position.

Still more specifically the latter object includes the provision of longitudinally and horizontally spaced rigidly connected control areas on the programming mechanism to be successively capable of control operation.

Still another object is to provide means cooperating with an adjustable card receiver assembly to adapt the machine for different width time cards.

An object is also the provision of a novel card receiver carriage which is comprised of two main parts, one manually movable relatively to the other to effect an arbitrary out-of-program registration and, upon release, automatically returning to its initial position with respect to the other part which remained in an in-program position.

It is also an object to provide a time recorder in which the time card may be moved in two directions transversely to each other to locate a field thereof to receive a registration and in which the failure to locate said field properly prevents the registration from being effected.

A further object of the invention is the provision of automatic time printing means set in operation to effect a time registration on a card only when the card is properly positioned in a laterally movable card receiver and not unless the card receiver is also properly set in a proper program controlled lateral position.

It is also contemplated to provide means to prevent alternative out-of-program registration or to permit such registration depending on the presetting of an out-of-program controller.

An ancillary object is to provide program controlled means for effecting color shifting of the printing ribbon which acts directly on the ribbon without disturbing any ribbon supports.

The latter object is to shift the ribbon for color changes by shifting only the portion of the ribbon immediately adjacent the printing means.

It is also within the contemplation of the invention to provide means whereby such program operations as the horizontal shifting of the carriage, the vertical shifting of the card abutment, and the color change of the ribbon are all driven from a single clutching means, at periods determined by the setting of the program schedule, by a power means normally stationary which is set in operation by a separate power means used for time keeping purposes.

According to the invention, impulses from a master clock or other timing device cause the energization of an electromagnetic means periodically to operate interconnecting mechanism for tripping a clutching means. This mechanism may also be operated by any other suitable means such as a synchronous motor. Upon engagement of the clutching means, a drive motor is connected to operate drive mechanism for a type wheel unit. The type wheel unit consists of a minute wheel, an hour wheel, and a day wheel, each of these wheels being advanced at the proper time by positive drive from the motor in lieu of the customary spring-controlled carry mechanism. A novel program device comprising a rotatable drum is also advanced by the drive motor concurrently with the advance of the minute type wheel. The program drum is provided with operating elements which cooperate with associated mechanism to initiate various program operations of the machine at a differential time as desired. An automatic registration on a time card is effected by inserting the card a proper distance in the card receiver and exerting a slight downward pressure on the card. Since the value of an attendance recorder depends largely upon the accuracy of the time registrations on the card, the fact that the card must be properly positioned in order to receive a registration is particularly advantageous. The inserted card operates mechanism which causes the tripping of a print hammer to effect a printing operation under the action of a spring impelling means. Further clutching means then becomes engaged and the hammer is restored to its latched position by power driven mechanism. Interlocking means are provided to prevent any possibility of a print operation occurring when the type wheels are in motion or when any program shift is occurring. Also, means are provided to render it impossible to obtain a registration when the card receiver is positioned out of alignment with some printing position on the card, thereby assuring a neat-appearing time record. Out-of-program printing requires a manual shifting of the card receiver to the desired position and is under the control of a lockable means which renders printing effective or ineffective according to a predetermined setting.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 1 is a view of the machine in perspective with the cover on.

Fig. 6 is a sectional view of the motor drive mechanism taken along the line 6—6 of Fig. 3.

Fig. 7 is a front elevation view partly in section showing carriage shift mechanism.

Figure 8:
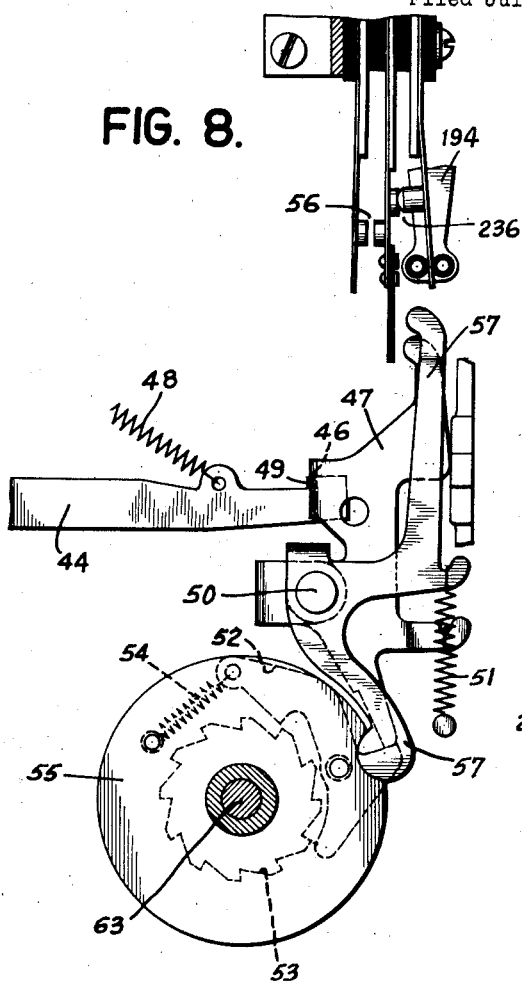
Figure 9:
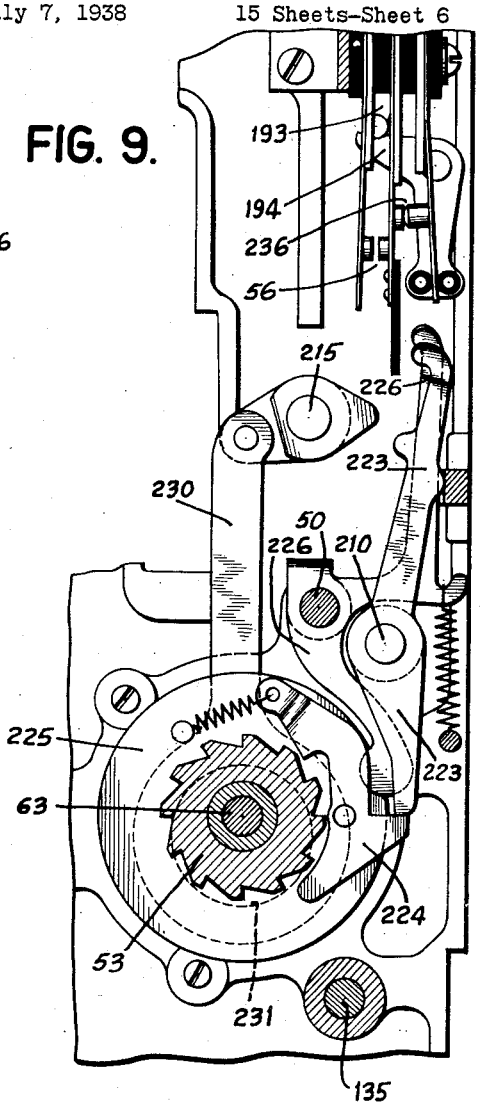

Figs. 8 and 9 are sectional views taken along the lines 8—8 and 9—9 respectively of Fig. 6 in the direction indicated by the arrows.

Figure 10:
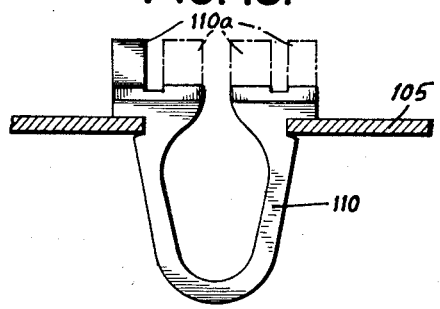

Fig. 10 is an enlarged detail view of an insertible operating element for a programming device.

Figure 11:
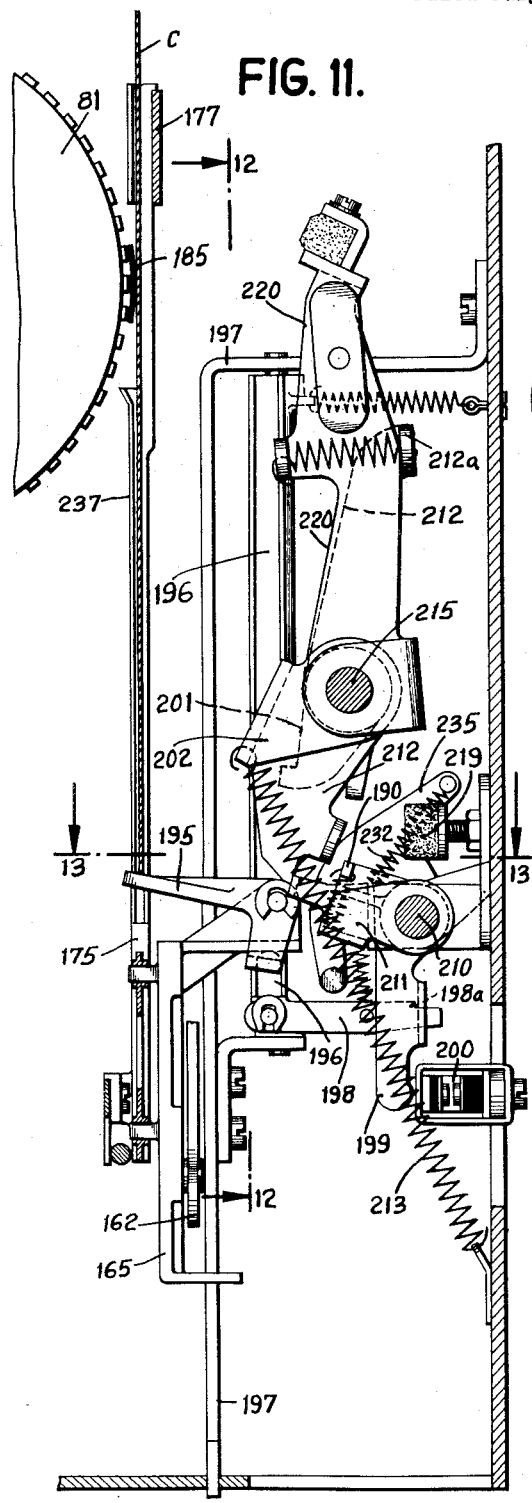

Fig. 11 is a side elevation view partly in section of the hammer operating mechanism.

Figure 12:
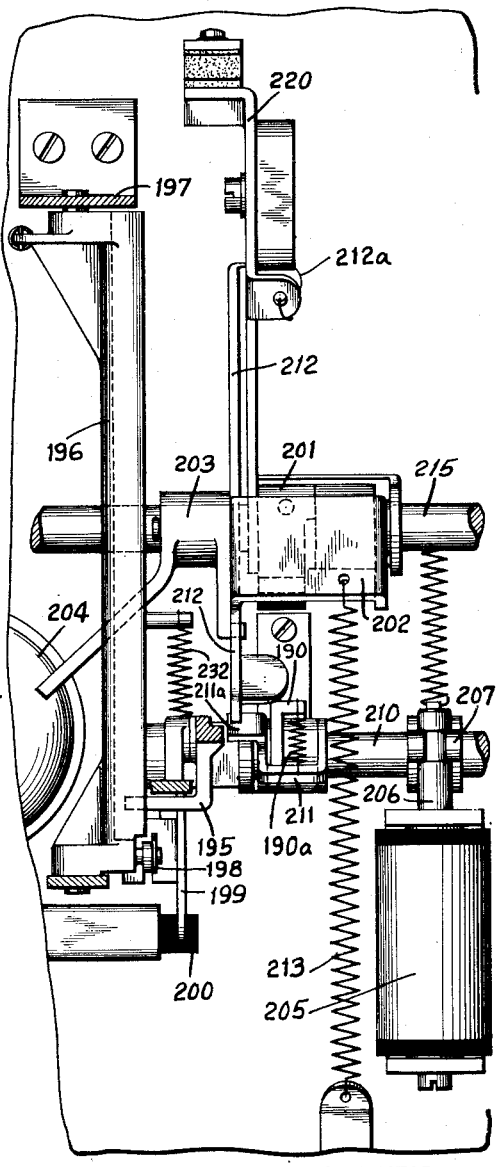

Fig. 12 is a sectional view taken along the line 12—12 of Fig. 11 in the direction of the arrows.

Figure 13:
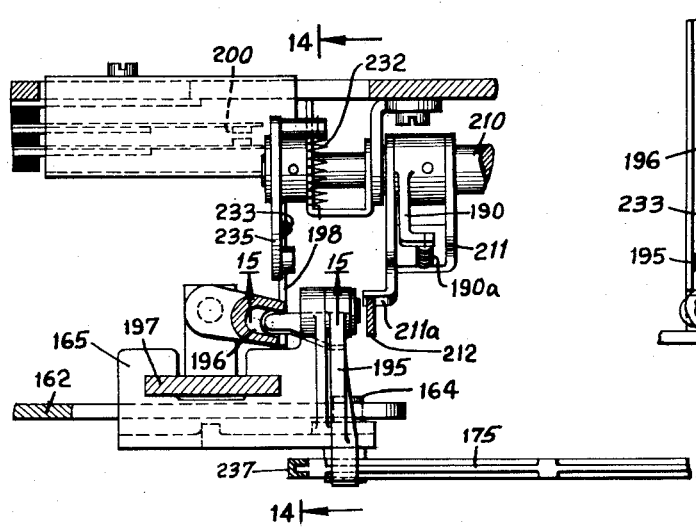

Fig. 13 is a plan view of the print operating mechanism.

Figure 14:
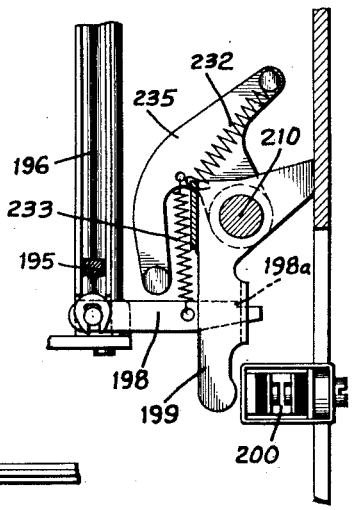

Fig. 14 is a sectional view at 14—14 of Fig. 13 to bring out the detail of the print contact operating arm and knock-off.

Figure 15:
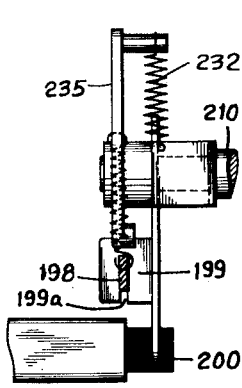

Fig. 15 is a sectional view at 15—15 of Fig. 14 taken in the direction indicated by the arrows to bring out further detail in the contact operating mechanism.

Figure 16:
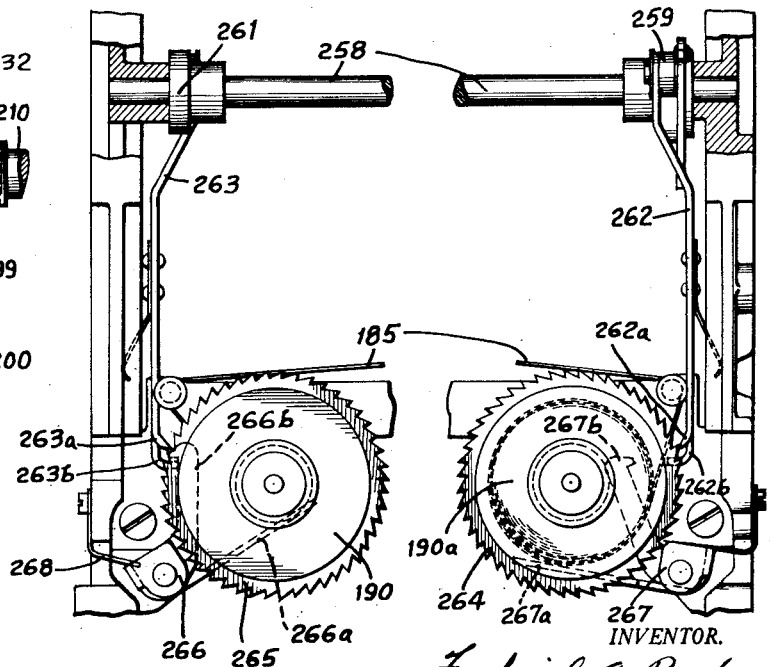

Fig. 16 is a plan view of the ribbon spacing mechanism.

Figure 17:
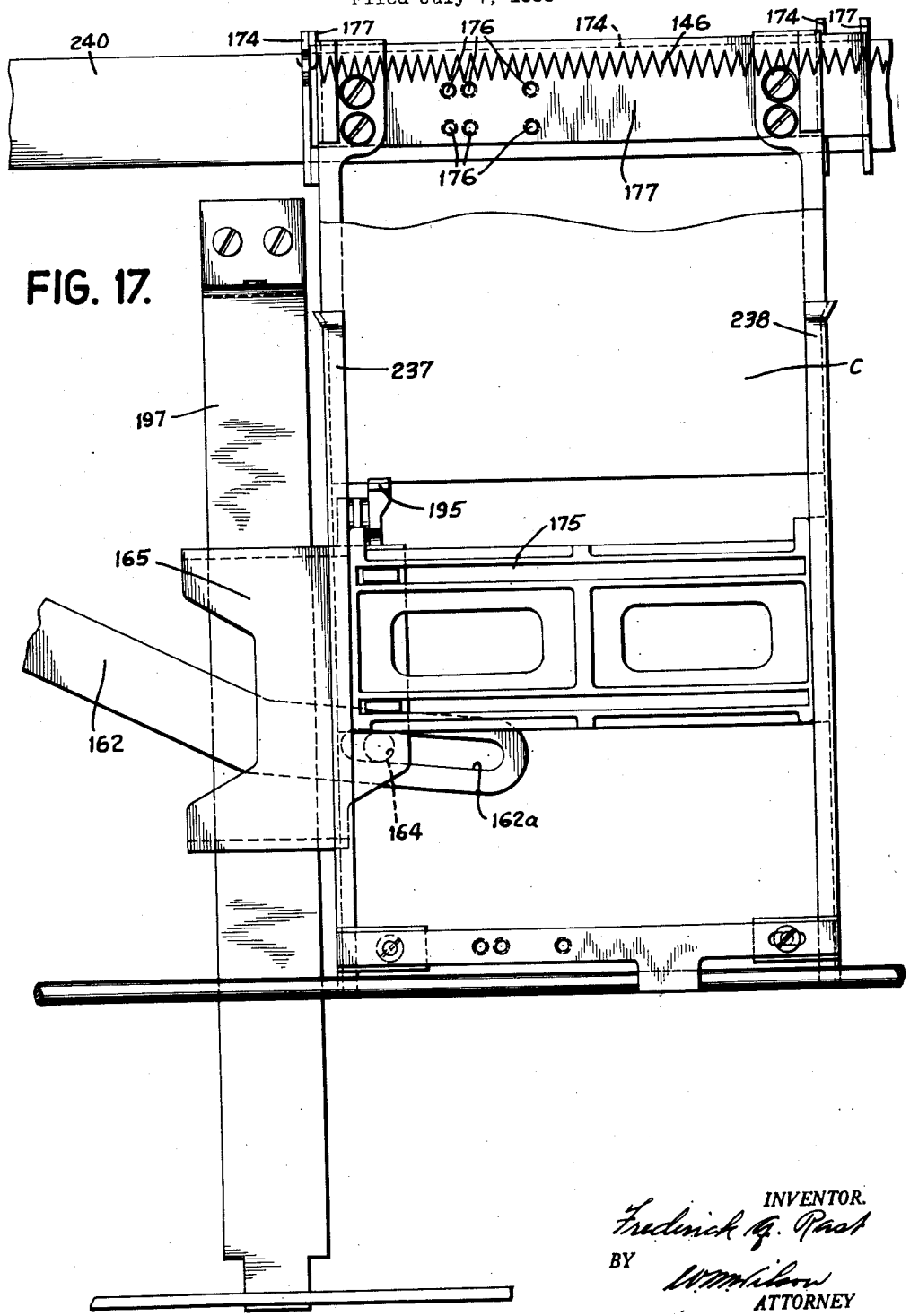

Fig. 17 is a front elevation view of the card receiver assembly including the card abutment.

Fig. 18 is a plan view of the card carriage and mechanism associated therewith.

Figure 21:
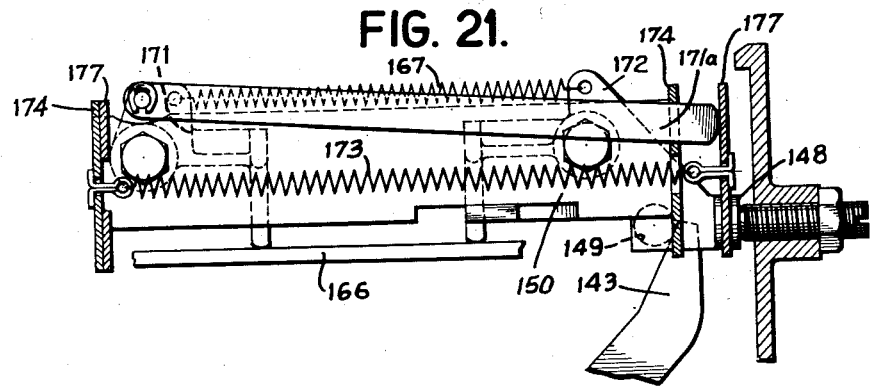

Figs. 19, 20 and 21 are detail sectional views taken along the lines 19—19, 20—20, and 21—21, respectively, of Fig. 18.

Figure 22:
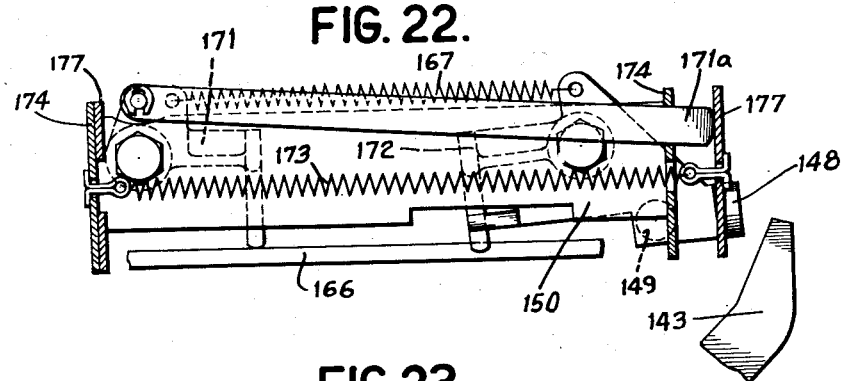

Fig. 22 is a front view of the carriage extended to the left.

Figure 23:
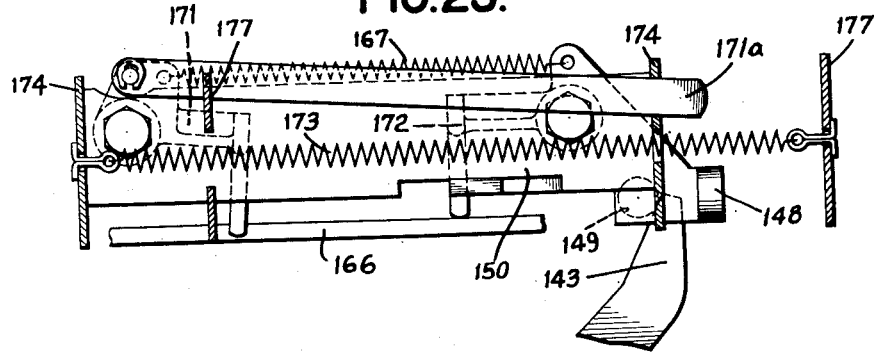

Fig. 23 is a front view of the carriage extended to the right.

Fig. 24 is a front view of a portion of the interlocking mechanism associated with the carriage.

Fig. 25 is a side view showing the detail of the contact operating mechanism associated with the interlocking mechanism.

Fig. 26 is a detail view of a portion of the ribbon spacing operating mechanism.

Figure 27:
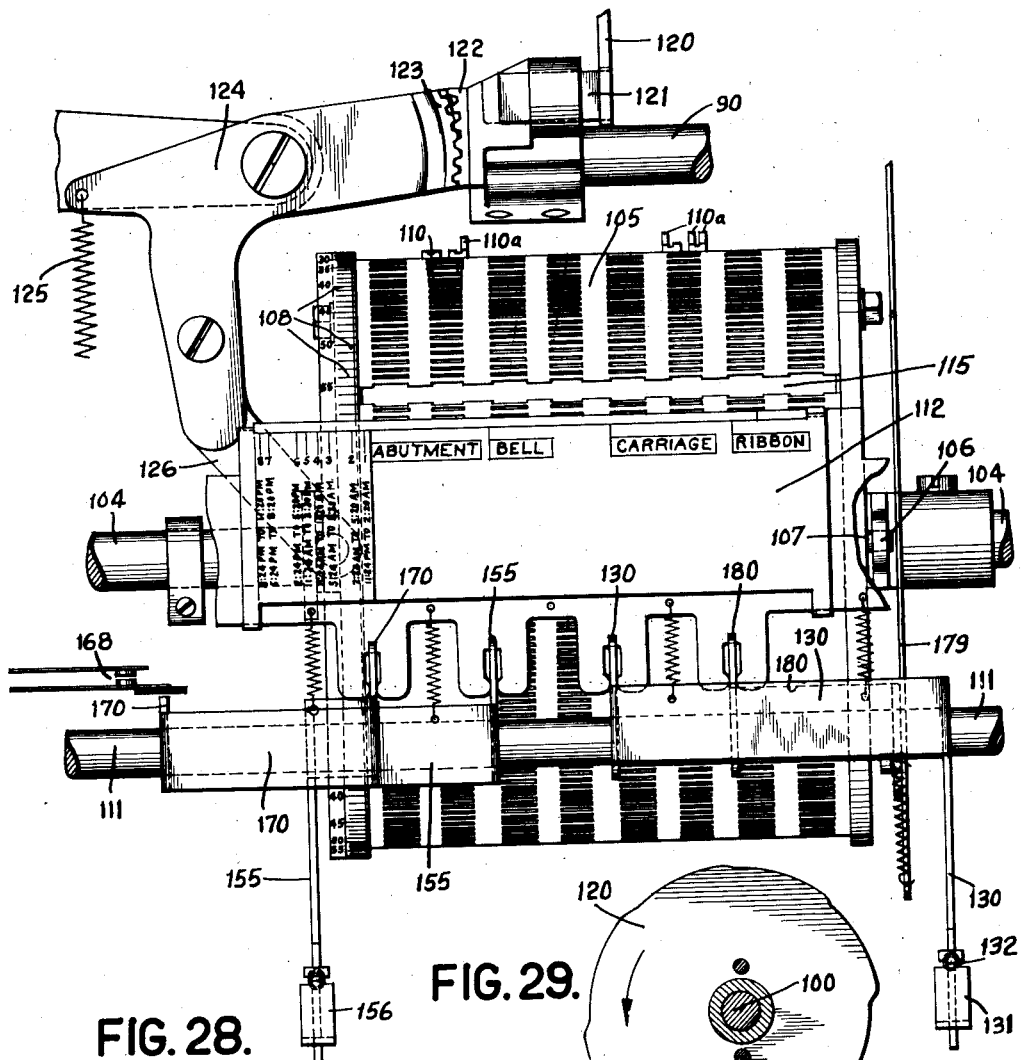

Fig. 27 is a front elevation of the program drum and shifting mechanism therefor.

Figure 28:
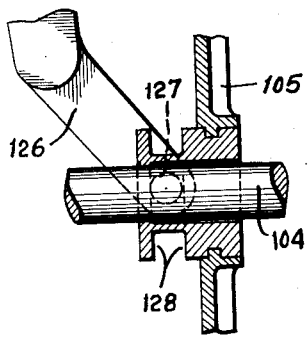

Fig. 28 is a further detail of a portion of the shifting mechanism for the program drum.

Figure 29:
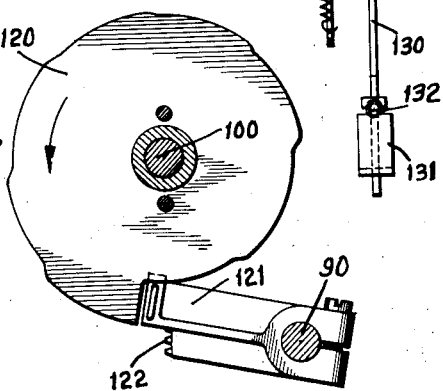
Figure 32:
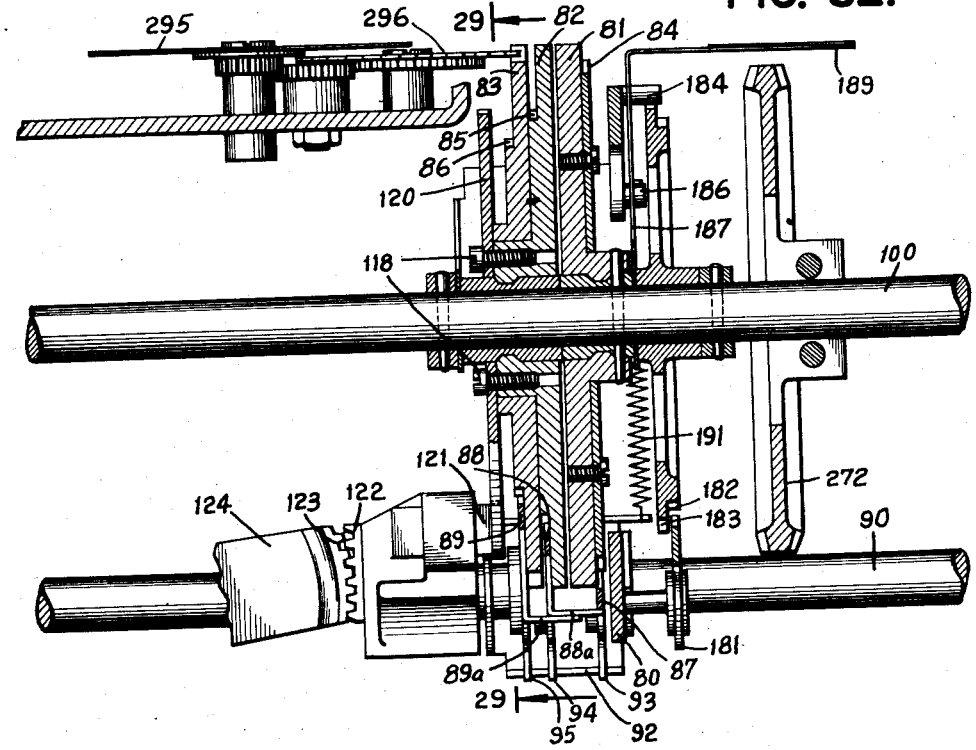

Fig. 29 is a sectional view of the step cam and cam follower for operating the drum taken along the line 29—29 of Fig. 32.

Figure 30:
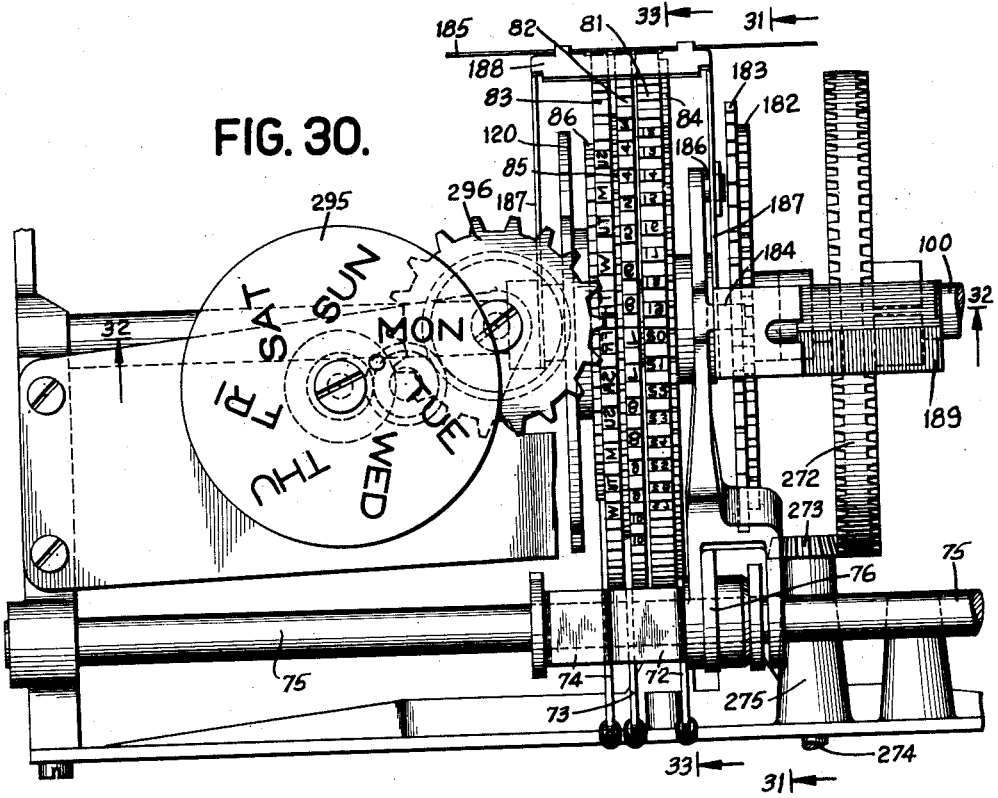

Fig. 30 is a plan view of the type wheel unit.

Figure 31:
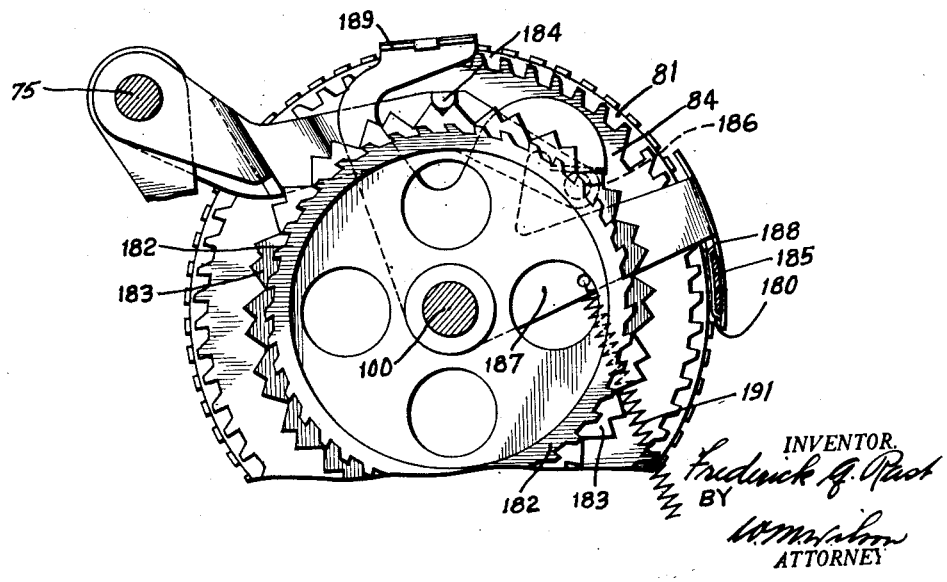

Fig. 31 is a side elevation of the ribbon color shifting mechanism.

Fig. 32 is a sectional view of the type wheel unit and a portion of the program drum shifting mechanism.

Figure 33:
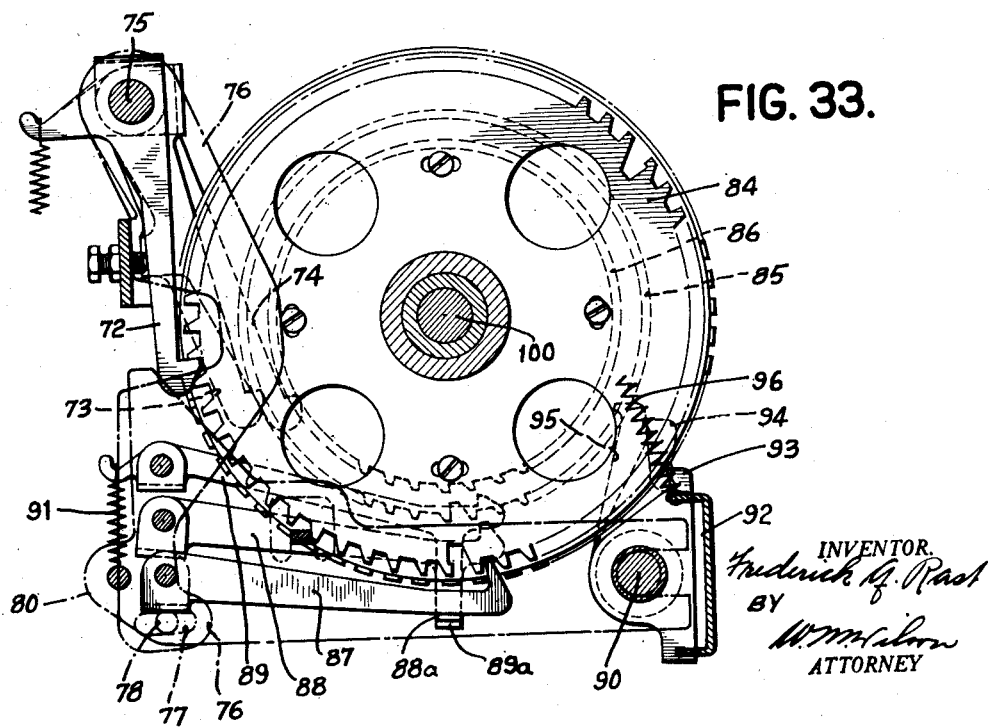

Fig. 33 is a side elevation of the type wheels and the drive pawls therefor.

Figure 3:
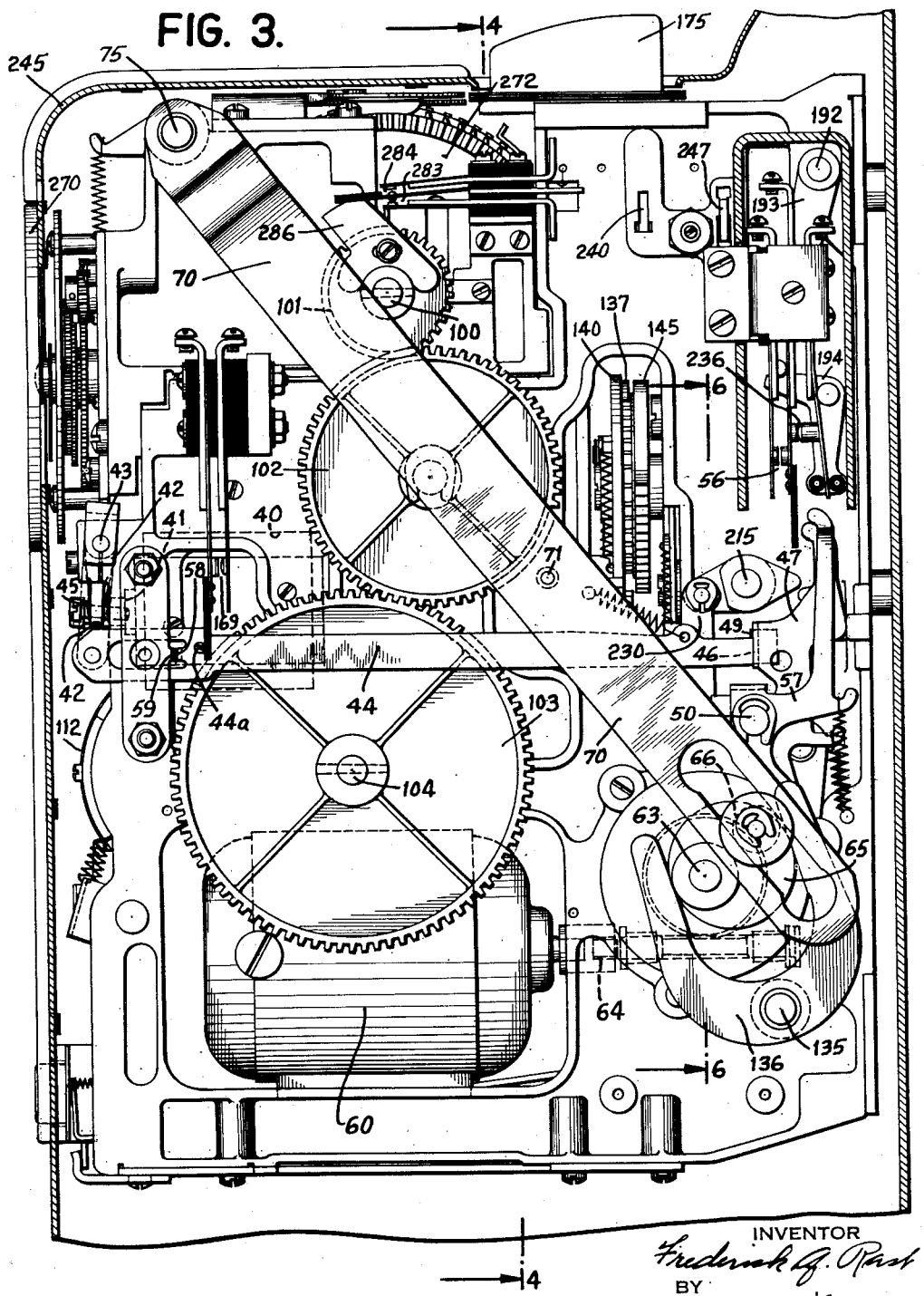
Fig. 3 is a sectional view through the cover taken generally along the line 3—3 of Fig. 1 in the direction indicated by the arrows.

In the preferred embodiment shown in the drawings, minute impulses from a master clock or other timing device (not shown) effect the energization of a solenoid 40 (Fig. 3). In locations where it is desirable to operate the machine as an independent unit a synchronous motor is customarily used in lieu of the solenoid 40. However, the mechanism operated is the same in either case and will now be described with reference to the drawings.

The energization of solenoid 40 causes its plunger 41 to be moved into the right and rocks a lever 42 about its pivot 43 so that the lower tip of this lever is moved to the right carrying a latch arm 44 to the right with it. The travel of the plunger 41 and hence of the lever 42 is limited by an adjustable stop 45. As the latch arm is moved to the right it slides longitudinally through a slot 46 in a latch member 47, and then it is moved up into an engaging position with the top edge of this slot by the action of a spring 48. In this position, a latch point 49 on arm 44 is located behind the top edge of slot 46 and in contact therewith. No movement is imparted to the latch member 47 as yet.

The impulse which energized the solenoid 40 is of a brief duration, approximately two seconds, and immediately upon the termination of this impulse this solenoid becomes deenergized. Spring 48 now urges arm 44 back to the left causing the latch member 47, which is now engaged with arm 44 as described above, to be rocked counterclockwise about its pivot shaft 50 against the action of a spring 51 (Fig. 8). Consequently the lower portion of the latch member 47 is moved to the right to permit a pawl 52 to drop into engagement with a ratchet 53 under the impetus of a spring 54. The pawl 52 is mounted upon the face of a cam 55 so that the engagement of the pawl with the ratchet has the effect of connecting the cam with the ratchet.

The upper end of latch member 47 operates a pair of motor contacts 56 to complete a circuit to a drive motor 60 (Fig. 3). This circuit will be described hereinafter in connection with the circuit diagram (Fig. 2), it being sufficient for the present to say that upon the closing of contacts 56 the motor operates to turn a shaft 64 clockwise as viewed from the front of the machine (Fig. 6). The drive runs from shaft 64 through a spiral gear connection 62 to a shaft 63 which is provided with a threaded portion 61 forming a convenient method of fastening the ratchet 53 to the shaft 63. Cam 55 is loosely mounted on the same shaft, but since pawl 52 is now engaged, this cam is carried with the ratchet as the latter is rotated by the motor. A cam follower 57 (Fig. 8) rides on the periphery of cam 55 and is shaped like a bell crank, being pivoted at 50 and having contact operating extension which is moved to the left as the lower extremity of the cam follower rides up out of the recess in the periphery of the cam 55 in which it is normally positioned. This has the effect of maintaining the motor contacts closed during the course of one revolution of the cam 55. Fixed to the outer face of cam 55 is an eccentric cam 65 (Fig. 6) on which there is a stud 66 adapted to cooperate with the sides of a slotted opening in an arm 70 (Fig. 3) to operate this arm upon movement of the cams 55 and 65. The upper extremity of arm 70 is fixed to a pivot shaft 75 and is provided with a knock-off stud 71 which moves down on the arm 44 during the course of its operation so as to cause the latch point 49 on this arm to be moved clear of the top edge of the slot 46 in the latch member 47. Spring 51 then restores the member 47 to normal, and the arm 44 is carried to the left until a projection 58 of this arm strikes against a stop 59. The plunger 41 is restored to its normal position through the connecting arm 42.

Up to this point it has been shown how the energization of a solenoid by a minute impulse causes a clutch to engage and a motor to operate to drive the clutch. Mechanism operated from this clutch to drive a type wheel unit will now be described. It will be remembered that the arm 70 is operated upon the revolution of cam 65, and that this arm is fixed to shaft 75. A rocking motion is thereby imparted to shaft 75 causing an arm 76 (Fig. 5) attached near the center of shaft 75 to be moved clockwise. This arm is provided with an elongated hole 77 through which a stud 78 projects. Stud 78 forms a part of a pawl-carrying member 80 which is moved forward with the arm 76 as the stud engages the rear end of the slot 77. The forward movement of the pawl-carrying member 80 provides the feed stroke for advancing the minute type wheel 81 (Fig. 30) one position. Also, when there is an hour and day change the pawl-carrying member advances the hour type wheel 82 and the day type wheel 83 one position in a manner which will now be described.

The pawl-carrying member 80 is provided with three type unit feed pawls 87, 88 and 89 (Fig. 33) which cooperate with type wheel ratchets 84, 85 and 86 of the minute, hour, and day type wheels respectively. A spring 91 urges all of the type wheel feed pawls toward their respective ratchets, thus insuring that the minute pawl 87 is engaged with its ratchet 84. The travel of the hour pawl 88 and the day pawl 89 toward their respective ratchets 85 and 86 is limited by the seating of the minute pawl in a tooth of its ratchet 84, the hour pawl having a projection 88a which bears against the under side of the minute pawl 87 and the day pawl 89 having a similar projection 89a which encounters the under side of the hour pawl. By this construction, the hour and day pawls are maintained just out of engagement with their respective ratchets as long as the minute pawl 87 is seated in a normal depth tooth of its ratchet 84. However, ratchet 84 is provided with two deep teeth so that when the minute pawl 87 drops into one of these teeth the hour pawl 88 is permitted to engage its ratchet 85 to advance the latter one tooth on the forward stroke of the pawl-carrying member 80. The hour wheel ratchet 85 is provided with one deep tooth so that at the end of one revolution of the hour wheel when the hour pawl 88 drops into this tooth, the day pawl 89 is permitted to engage its ratchet 86 to advance the same one tooth on the forward stroke of the member 80. The reason for having two deep teeth on the minute wheel 81 rather than one as on the hour wheel 82 is to allow for proper lateral movement of a program device controlled from the hour wheel which will be described later. It will be noted that the hour type wheel characters appear doubly (Fig. 30), one following the other, and therefore it is necessary to advance the hour wheel twice to effect a difference in reading of one hour. The first advancement of the hour type wheel may occur at any predetermined point in the revolution of the minute wheel 81 depending upon the location of the first deep tooth in the ratchet 84. This advancement of the hour wheel, however, has no effect in changing the reading of the hour wheel but simply moves this wheel so that the first of a pair of similar type characters is moved out of a registering position and the second character of the pair is advanced to supplant the first. The second deep tooth on the minute wheel ratchet 84 is positioned to become operative for the advancement of the hour wheel 82 as the minute wheel 81 is advanced on the sixtieth minute. The minute wheel is numbered from 00 to 59. The hour wheel is numbered half way around from 1 to 12, and for the other half from 1 to 12, double numbering being employed as described above. The p.m. hours are underlined to distinguish them from the a.m. hours. Thus a total of forty-eight type characters are provided on the hour wheel as compared with sixty on the minute wheel. The day wheel 83 is provided with forty-two type characters representing forty-two consecutive days or a total of six weeks passage of time for one complete revolution of this wheel. It will be noted that the number of teeth on the type wheel ratchets correspond to the number of characters on their respective type wheels. Consequently if the hour wheel 82 was provided with a single type character for each hour of the day there would be only twenty-four teeth on the hour wheel ratchet. If this were the case, then the actual movement of the hour wheel upon one tooth advancement of its ratchet 85 would be 2½ times the movement of the minute wheel and 1⅐ times the movement of the day wheel. This condition is obviously undesirable and therefore by providing forty-eight characters on the hour wheel it tends to even up the movement of the three type wheels as they are advanced by their respective pawls. Since the day wheel is provided with forty-two characters, it need be advanced only once at the end of one complete revolution of the hour wheel, and therefore one deep tooth on the hour wheel ratchet 85 is sufficient for attaining the proper movement of the day wheel.

Returning now to the movement of the pawl carrying member 80, as this member moves to the left as viewed in Fig. 33 it permits a detent bracket 92 carrying detent pawls 93, 94 and 95 to be rocked counterclockwise about a pivot shaft 90 by a spring 96 due to the movement of a stud 97 (Fig. 5) on the member 80 past a camming surface on an extension 98 of the detent bracket 92. The timing is such that these detent pawls engage the typewheel ratchets at the completion of the forward stroke. The typewheels are not allowed to move backward on the return stroke because they are positioned by further detent pawls 72, 73, and 74 (Fig. 33) which are freely mounted on the shaft 75. It will be remembered that the movement of member 80 to the left results from the rocking of shaft 75 by the arm 70 so that the arm 76 attached to that shaft is moved to the left bringing member 80 with it. Then, as arm 70 operates shaft 75 in the opposite direction, the arm 76 is moved to the rear and the pawl-carrying member 80 is returned to its rearward position. It will be noted that by mounting the typewheel feed pawls on one member, the shifting of the various typewheels on time changes is under mechanical connection with the drive motor 60. Consequently, the usual spring carry lever mechanism is replaced by a power driven mechanism for each of the type wheels. This is desirable to prevent incorrect operation of the type wheel unit in instances where the type wheels have accumulated considerable dirt so as to create binds which might otherwise have become too great for the spring carry lever type to handle.

Figure 5:
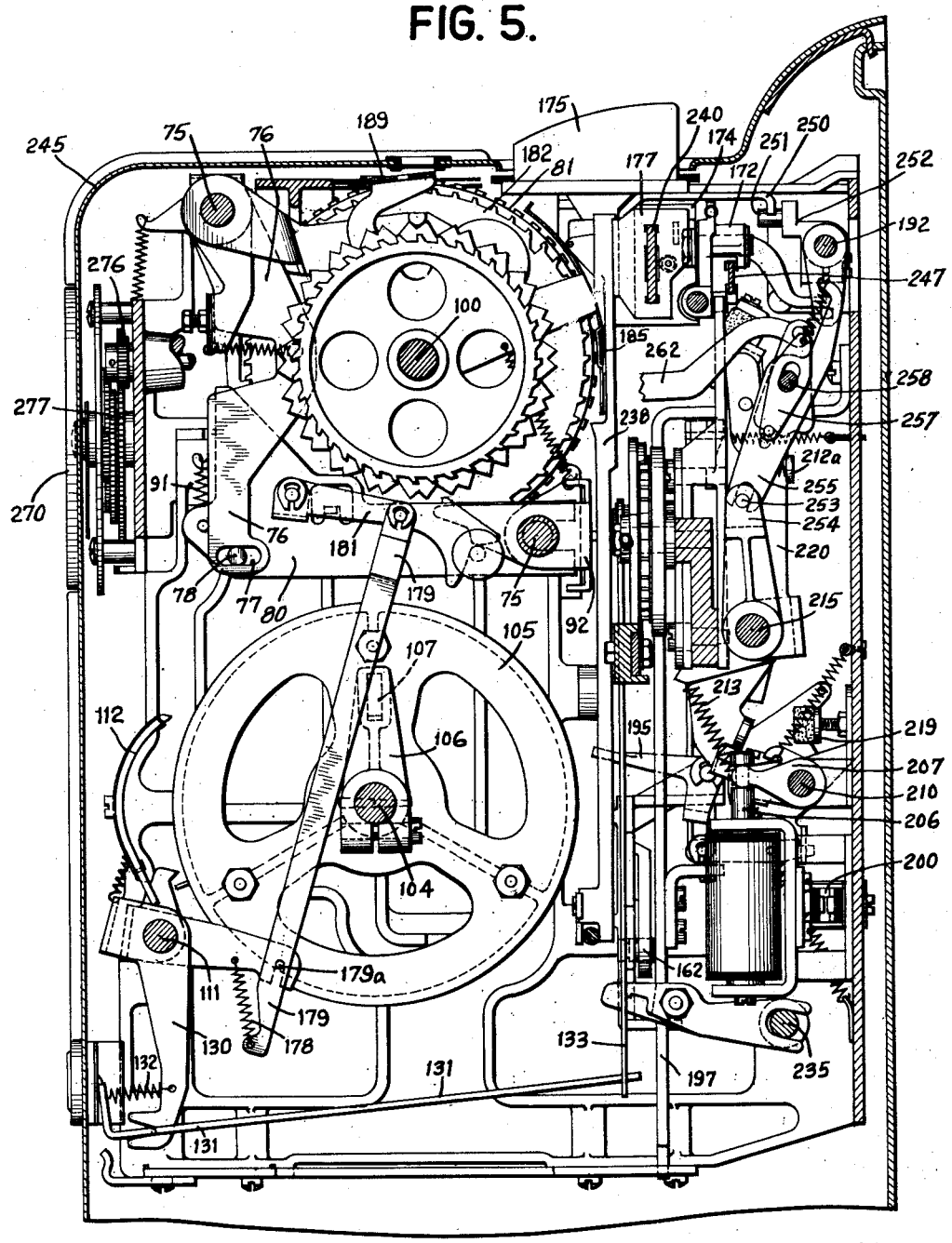
Fig. 5 is a sectional view of the machine taken at 5—5 of Fig. 4.

In the type wheel unit described above, the minute type wheel 81 (Fig. 30) is fixed to the shaft 100 so that this shaft is rotated a certain distance upon each advance of the minute type wheel. Thus, by connecting a program device such as a rotatable drum 105 (Fig. 5) through suitable gearing to the type wheel shaft 100, it may be rotated in accordance with the advance of the minute type wheel 81 by a minute impulse. This gearing includes a gear 101 (Fig. 3) affixed to the right extremity of shaft 100 and meshing with an idler gear 102 which in turn transmits motion to a gear 103 to drive the latter clockwise as viewed in Fig. 3. The gear 103 is affixed to a shaft 104 to which is also fastened a dog 106 (Fig. 5). This dog extends through a slot 107 in the frame of the drum 105 so as to cause the drum to rotate with the shaft 104, the drum itself being freely mounted on this shaft. The gearing is arranged for a reduction which causes the drum to rotate once in three hours whereas the minute type wheel makes a complete revolution in one hour. A scale 108 (Fig. 27) graduated in minutes and having numerical designations for every five minutes is provided for the drum 105 which is constructed with a multiplicity of slots, eight slots being aligned horizontally with each minute graduation of the scale 108 and adapted to receive tiny U-shaped insertible elements 110. These elements are inserted in the various slots of the drum 105 according to program requirements. Each element 110 is provided originally with four projections 110a, (Fig. 10) any of which may be easily broken off if not needed. As the insertible elements 110 are moved past certain mechanisms mounted on a shaft 111 (Fig. 27) these mechanisms are operated by the projections 110a so as to initiate various program operations in the machine. The distance travelled by each element in a minute is such that the engagement lasts for one minute only. The manner in which this occurs will become more evident when the individual program operations are described in detail hereinafter.

The drum 105 takes three hours to make one complete revolution. At the end of each revolution it is necessary to shift the drum longitudinally on its shaft 104 a distance equivalent to the distance between center lines of adjacent projections 110a on the insertible elements 110. The drum is moved to the left and therefore the next adjacent projection to the right is moved into a position to become operative during the next three-hour period. A schedule of three-hour periods is illustrated on a face plate 112 and it will be noted that there is a three minute dead space at the end of each three hour period, that is, between 2:20 and 2:24, 5:20 a. m. and 5:24 a. m., etc. The purpose of this is to allow for the return movement of the drum to its starting position at the end of eight three-hour periods, which movement will be described later. An opening 115 is left in the drum at a desired point and covers the width of three minute graduations on the scale 108. Consequently no insertible elements 110a may be placed there to interfere with the return of the drum 105 to the right, which movement will be presently described. Otherwise, if no dead space were allowed in the periphery of the drum, projections 110a on insertible elements 110 placed in this location would interfere with the mechanisms on shaft 111 and prevent correct operation.

The longitudinal movement of the program drum 105 referred to above is operated from a large cam 120 (Fig. 32) which is fixed by screws 118 to the hour wheel 82. Cam 120 is provided with eight steps gradually rising to a high point (Fig. 29). Each successive step is reached after six advances of the hour wheel and causes the shifting of the drum 105 one position toward the left through the action of a cam follower 121 which is fixed to the rockable shaft 90. The six advances of the hour wheel represent the passage of a three hour period during which time the program drum 105 has moved through one complete revolution. Since program operations frequently occur on the even hour a condition might frequently occur where the drum 105 is shifted to the left just as the machine is set for a program operation so as to create an undesirable action between the operating projections 110a and the mechanism on shaft 111. Thus, it becomes necessary to impart this longitudinal movement to the drum 105 at some time when program operations are not to occur simultaneously. It has been found that a convenient time is around twenty-one minutes past the hour in most cases because rarely is a program operation scheduled to occur at this point. To accomplish this a second deep tooth is provided on the minute wheel ratchet as already described causing two movements of the hour wheel for each revolution of the minute wheel and therefore two advances of the cam 120 which moves with the minute wheel. Cam 120 is so timed that cam follower 121 reaches the successive steps as cam 120 is being advanced by the first deep tooth. The hour wheel is advanced as previously described but does not change to the next hour reading until further operated by the minute pawl dropping in the second deep tooth on the minute wheel ratchet which is located on the hour.

A sector gear 122 on the cam follower 121 meshes with a sector gear 123 (Fig. 27) on a bell crank 124 to cause this bell crank to rock clockwise against the action of a spring 125. An arm 126 connected to the bell crank 124 extends downward and at its lower extremity has a stud 127 which protrudes between the sides of a slotted collar 128 (Fig. 28) on the left side of the drum 105. Consequently, as cam follower 121 rises to a new step on cam 120 the bell crank 124 is rocked clockwise against the action of spring 125 so that the lower end of arm 126 is carried to the left moving collar 128 and drum 105 to the left with it. The distance of movement to the left corresponds to the distance between the center lines of adjacent projections 110a on an insertible element 110. When the cam follower 121 drops off the high point of cam 120, the drum 105 is restored all the way to the right up against the dog 106 by the action of spring 125.

Referring now to the face plate 112, it is seen that the words "Abutment," "Bell," "Carriage," and "Ribbon" appear thereon. For each one of these headings a horizontal distance on the drum 105 equal to the width of two slots is allotted. This provides room for two elements 110 or in other words a possibility of eight operating projections 110a for each minute graduation around the drum. The necessity for this is evident in that the drum makes eight revolutions in a day and it is desirous of having minute regulation of the program mechanism during any one or all of these periods of the day. The various operations of the machine which are under program control, as designated by the names on the face plate 85, will now be described.

The word "Carriage" on the face plate 112 indicates the section of the program drum 105 which is allotted to the horizontal shifting of card receiver carriage to change the registration positions on the card. For example, the classification of the registrations such as "morning in," "noon out," "noon in," "night out," "extra in," "extra out" are represented by different printing positions on the card horizontally displaced from each other.

An insertible element 110, placed in any slot in the space of the drum provided for the heading "Carriage," operates against the upper part of a bail 130 to cause this bail to rock on its shaft 111 so that the lower part of the bail is moved toward the rear of the machine. This lower part of bail 130 is bifurcated and extends down through an elongated hole in an arm 131. These two members are connected by a spring 132 (Fig. 5) and thus arm 131 is moved toward the rear of the machine. The arm 131 in its rearward movement pushes against an arm 133 swinging the lower part of the arm 133 to the rear. An arm 134 (Fig. 7) is bifurcated to form a guide for arm 133 in this movement, and is provided with an operating projection 134a which rests just above a small shoulder 133a on the arm 133 when the latter arm has reached its limit of travel to the rear. The arm 134 is fixed to a shaft 135 at the right extremity of which is mounted a U-shaped cam follower 136 (Fig. 3) cooperating with the eccentric cam 65 to impart a rocking motion to shaft 135 upon each minute impulse. Thus, arm 134 is rocked downward once a minute and projection 134a, if arm 133 is in its rearward position, engages the shoulder 133a and moves arm 133 down. When arm 133 has not been moved to the rear the projection 134a moves down freely behind the shoulder 133a upon the rocking of shaft 135.

As arm 133 moves downward, it imparts a feed stroke to a pawl assembly 137 to advance a ratchet 140 one tooth. The pawl assembly is restored to normal against its stop 138 by a spring 139, and this movement at the same time raises arm 133 to its normal position. The ratchet 140 is fixed to a cam 145 having eight steps around its periphery which is equal to the maximum number of horizontal printing positions which are normally required. In fact, the customary number of horizontal positions is six and have been already mentioned as "morning in," "noon out," "night out," "extra in," and "extra out." A cam follower 144 cooperates with the cam 145 and is fastened to an arm 143 which is pivotally mounted on a shaft 142 carried by a bracket 141. The upper end of arm 143 bears against a stud 149 on the card receiver carriage generally designated 150 so as to move the carriage to the left a predetermined distance upon the advancing of the cam follower 144 over the steps of the cam 145. If the number of horizontal displaced registering positions on the time card being used is only six instead of the maximum of eight as displayed in the embodiment by the use of an eight-step cam 145, then an adjustable stop 148 serves to position the card in an initial position at a point where it would have normally been after two movements of the cam 145. Thus, the first two movements of the cam 145 under this condition does not impart any movement to the carriage 150. The third to eight stepping of the cam, however, does move the carriage to provides six horizontal shifts. Where any number less than an eight position card is being used, the width of the card receiver may be decreased to take care of the smaller width of this card as compared to a full eight column card. This is done by moving the left guide of the card receiver 175 (Fig. 17) to the right and fastening it in the proper place as predetermined by the screw holes 176 in a plate 177 of the carriage 150. It will be noted that in the above manner the machine may be set for various width cards and this fact lends increased flexibility of operation to the machine. When the carriage is shifted all the way over to the left, the next horizontal shift program operation causes cam follower 144 to drop off the high point of cam 145 and allows a quick return of the carriage to its initial position under the urging of a spring 146 (Fig. 17).

Another program operation to be performed is labeled "Abutment" and relates to the vertical shifting of the card abutment to change the registration positions vertically on the card. This shifting of registering positions customarily represents day-to-day changes. An insertible element 110 placed in any slot in the space of the drum 105 allotted to "Abutment" operates a bail 155 (Fig. 27) so as to cause the lower end of a bail 155 to be moved toward the rear of the machine thereby transmitting motion through an arm 156 to push the lower part of an arm 157 (Fig. 4) to the rear. When arm 157 is moved to the rear a shoulder 157a on this arm is moved under an operating projection 158a on an arm 158 which is fixed to the shaft 135. Shaft 135 rocks every minute impulse as previously described and when arm 158 moves down it carries arm 157, now in an engaging position, downward to transmit a feeding stroke to a pawl assembly 152 to space a ratchet 153 one tooth. A spring 154 returns the pawl assembly to normal against a stop 151 and at the same time raises arm 157 to its normal position. The mechanism just described for advancing the ratchet 153 is similar to that previously set forth for advancing the ratchet 140 in the carriage shift operation.

The ratchet 153 is fixed to a cam 160 having a plurality of steps around its periphery equal to the number of vertical printing positions which the program requires. Seven steps, for example, would be supplied for a weekly card with a vertical shift for each day of the week. A cam follower 161 cooperates with the cam 160 and is attached to a lever 162 which is pivoted at 163 and extends to the right and downwardly, having an elongated hole 162a through which a stud 164 on the abutment support member 165 projects. Thus, as the cam follower 161 rides over the steps of the cam 160, arm 162 is moved up about its pivot 163 causing the abutment member 165 to be raised with it. Each raising of the abutment corresponds to a vertical shifting of one registering position on the time card which, in this machine, signifies the passage of one day's time. After the abutment has been raised to its upward limit of travel, the next vertical shift program operation causes the cam follower 161 to drop off the high point of cam 160 and allows the abutment to return quickly to its initial position by the force of gravity. It is to be understood that the shifting of the abutment may be utilized for "in" and "out" recordings and that the carriage may represent day-to-day changes by merely interchanging the insertible operating elements of the program drum.

Figure 2:
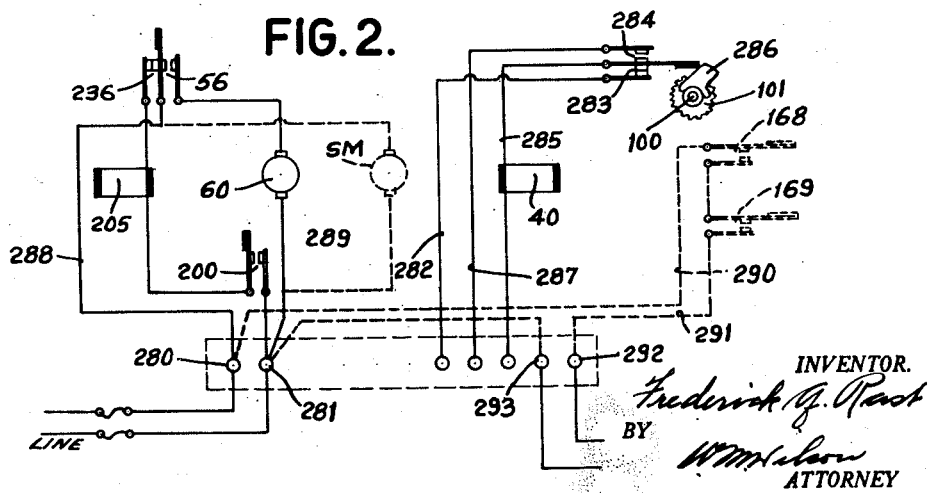
Fig. 2 is a circuit diagram of the machine.

A third operation listed on the face plate 112 is headed "Bell" and signifies a bell ringing operation to be effected when an insertible element placed in any predetermined position in the allotted portion of the drum 105 causes a bail 170 (Fig. 27) to rock on its shaft 111 so that a rear extension of bail 170 moves upwardly to close a pair of contacts 168. These contacts, in conjunction with a further pair of contacts 169 (Fig. 3) which are operated on each minute impulse by a stud 44a on arm 44, complete a bell ringing circuit. Where a synchronous motor is employed, a cam (not shown) on this motor operates contacts 169. Contacts 169 determine the duration of the ringing of the bell. Where bell ringing is controlled by a master clock, this program feature is not generally used. The point is, however, that the extreme flexibility of the machine permits a different bell schedule for each independent machine in a time system and warning signals may be sounded as often as one minute intervals if so required. The circuit is very simple and will be described later in connection with the circuit diagram (Fig. 2).

Figure 4:
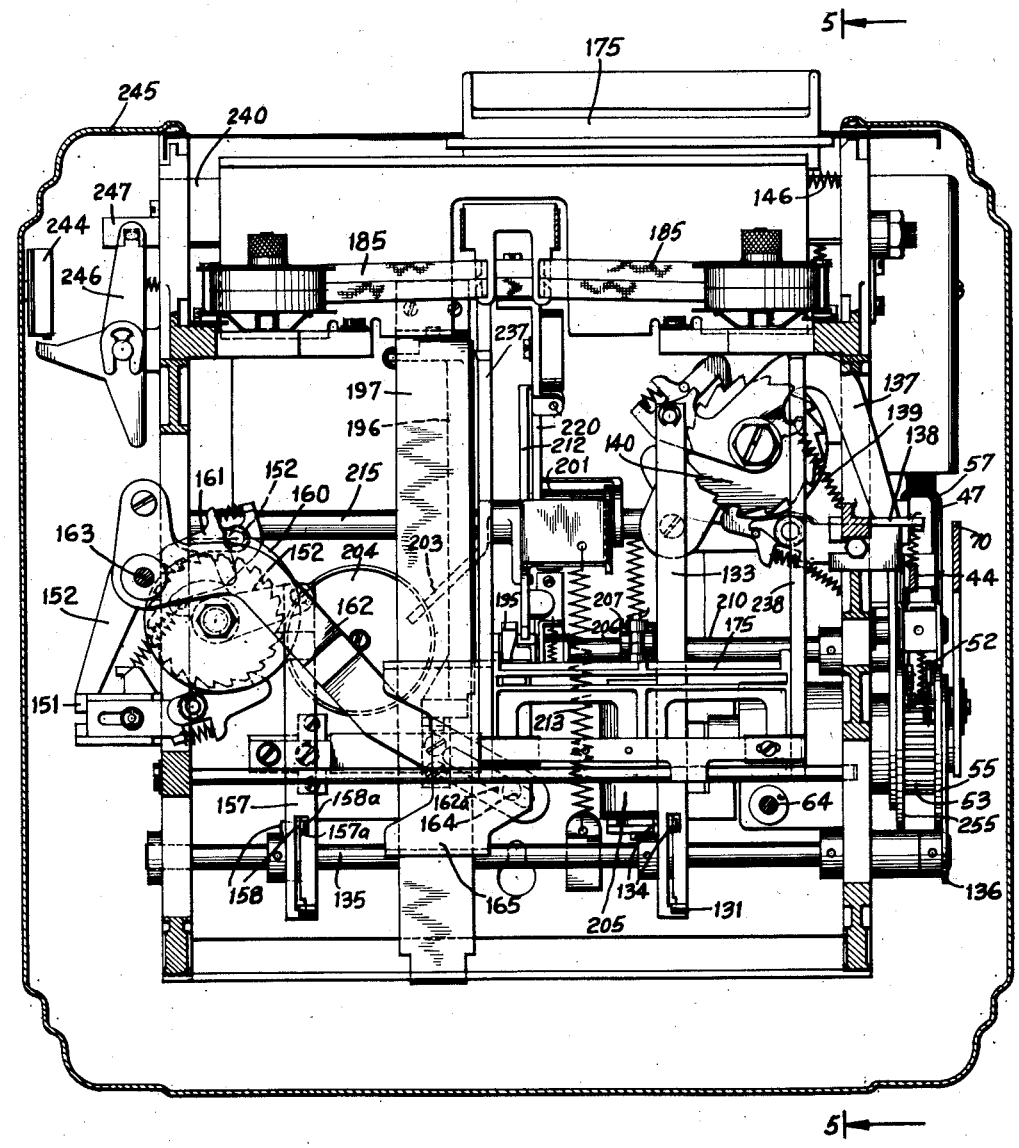
Fig. 4 is a sectional view taken at 4—4 of Fig. 3 in the direction indicated by the arrows.

The remaining program operation, designated "Ribbon," is the color shifting of a two-colored ribbon 185 (Fig. 4). Ribbon 185 has an upper part comprising a band of one color and a lower part comprising a band of a contrasting color. Two colors customarily used are blue and red to represent in-program and out-of-program recordings, respectively. A bail 180 (Fig. 27) is rocked forward by an insertible element placed in the drum 105 in a manner similar to that already described for the other program operations. This causes a rear extension on the right side of bail 180 to be moved upward. This portion of bail 180 is connected by a spring 178 to an arm 179, and a stud 179a on the arm 179 rides in a slot in the bail 180 at its rear extremity (Fig. 5). The upper end of arm 179 is connected to a feed pawl 181 which is pivotally carried by the pawl carrying member 80 so that as the arm 179 is moved upward, pawl 181 moves into engagement with a ratchet 182. Then, upon the forward movement of the member 80 as previously described, ratchet 182 is advanced one tooth. As this ratchet is moved it carries another ratchet 183 (Fig. 31) with it and a detent pawl 184 cooperating with the ratchet 183 is raised out of one tooth and into the next, pivoting as it does so about shaft 75. The ratchet 183 is constructed so that every other tooth is a deep tooth. Detent pawl 184 is provided with a stud 186 which projects between the end of the middle arm and the side of the lower arm of ribbon shift lever 187. This lever is alternately raised and lowered as detent pawl 184 rides first in a shallow tooth and then in a deep tooth. The ribbon 185 runs through a guide 188 at one end of lever 187 and is thus moved up or down with the lever to effect a change in the portion of the ribbon which is in alignment with the printing position, thereby changing the color of the registrations. On the upper arm of lever 187 is a color indicating strip 189 which gives visible evidence to the operator what color registrations are being printed by the recorder at that time. A spring 191 normally biases the ribbon shift lever 187 in a clockwise direction about the shaft 100. The detent pawl 184 drops into engagement with its ratchet 183 partly by gravity and also by the urging of the spring 191 since the lever 187 encounters the stud 186 on the detent pawl and assures that the pawl becomes seated in its ratchet.

In the foregoing description, the internal recording and programming operations of the machine have been set forth. It might be well at this point to consider the machine from the operator's standpoint, that is, what occurs when he inserts his time card C in the throat of the card receiver 175 and exerts a slight downward pressure on the card. The card C (Fig. 11) is inserted so that its printing surface faces the front of the machine and it must be inserted all the way down in the card receiver in order to effect a registration in a manner which will now be described.

The bottom edge of the card operates against one arm of a small bell crank 195, the other arm of which rocks a vertical bail 196 which is pivotally mounted on a supporting member 197. The purpose of the bail 196 is to permit the operation of the print contacts 200 regardless of the position of the abutment, the bell crank 195 being pivotally carried by the abutment. At the lower end of this bail is connected an arm 198 which is moved to the rear upon operation of the bail 196. The arm 198 is provided with a latch point 198a which engages on the upper edge of a slot 199a (Fig. 15) in a lever 199 and carries this lever to the rear also. Lever 199, in its movement to the rear, closes a pair of contacts 200 which complete a circuit to energize a solenoid 205 (Fig. 12). The circuit will be described later. A solenoid plunger 206 is moved down and carries with it an arm 207 which is fixed to a shaft 210 causing this shaft to be operated so as to rock an arm 190 forward and down so as to encounter a U-shaped lever 211 and carry this lever with it. A latch point 211a on the end of arm 211 is moved down clear of the bottom edge of the hammer operating lever 212. The arm 190 is fixed to the shaft 210 whereas lever 211 is free on this shaft and therefore a spring 190a is provided to keep these members in close relation and to bias the lever 211 toward its latching position. When lever 212 is released as described above, a strong spring 213 operates on a bracket 214 connected with this lever to pull the lower portion of the lever to the rear and allow the upper part to move rapidly to the front, lever 212 being pivotally fastened to a shaft 215. Loosely mounted on shaft 215 is the hammer 220 itself and is normally positioned against an ear 212a on the upper end of lever 212 by a spring 218. The brisk, forward movement of lever 212 is imparted through the ear 212a to the hammer 220. The operation is such that whereas the upper part of lever 212 moves only a certain distance ahead, as determined by the lower end of this lever striking against a buffer stop 219, the hammer itself springs ahead under momentum and strikes the card which is positioned between the hammer and the type wheels thereby effecting a registration of the time on the card as manifested by the type wheels. A U-shaped lever 203 (Fig. 12) has one end in the path of the hammer lever 212 so as to be operated on each tripping of lever 212. The other end of the U-shaped lever 203, moves against a bell 204 to give a ringing sound to each recording. This is generally desired by employers so as to indicate that a registering operation of the recorder is taking place. The tripping of the hammer 220 occurs almost instantaneously and is therefore fast enough to prevent any possibility of error in position of registration by the operator removing the card very rapidly. Upon completing the registration, the hammer is moved back a slight distance by the spring 218 and then the operating lever 212 and the hammer 220 are restored by the drive motor 60 in a manner which will now be described.

At the right extremity of shaft 210 is a latch member 223 (Fig. 9) which is fixed to shaft 210 so as to be moved with the shaft as the latter is rocked by the action of the solenoid 205. This movement of arm 223 releases a pawl 224 and permits it to engage the ratchet 53. The upper end of latch member 223 operates the motor contacts 56 to start the motor. A large cam 225 carries the pawl 223 and rotates with the ratchet when the pawl is engaged. A cam follower 226 cooperates with the cam 225, and the upper part of this cam follower 226 operates against the motor contacts 56 to maintain them closed during one revolution of the cam 225. This is necessary because latch member 223 is moved back to normal along with shaft 210 upon the deenergization of solenoid 205 which occurs almost immediately and the motor contacts tend to open. During the course of the revolution of cam 225, the hammer 220 is restored to normal by the action of a crank arm 230 formed with a ring at the lower end so as to enclose the periphery of an eccentric cam 231 which is attached to the face of a cam 225. The result of this movement is to rock the hammer shaft 215 counterclockwise as viewed in Fig. 9 so as to move an arm 201 against a shoulder 202 of lever 212 and force the lower part of this lever past the latch point 211a of the U-shaped arm 211 which has moved up into a latching position under the urging of spring 190a.

In order to prevent the hammer from tripping more than once for one depression of the card a knock-off member 235 (Fig. 14) is provided to force the arm 198 down immediately after the print contacts 200 have been closed so that the latch point 198a of this arm is lowered to clear the engaging edge of a slot in the contact operating arm 199. The knock-off member 235 is pivoted about the shaft 210 and is connected to lever 199 by a spring 232. This member is also connected with the arm 198 by a spring 233. The bias of these springs 232 and 233 keep the upper end of lever 199 normally against a portion of the frame of the machine as a stop.

The printing operation cannot occur on any minute program operation or on a shifting of the type wheels because of interlock contacts 236 (Fig. 3) which must be closed before the print solenoid 205 can become energized. These contacts are opened by the same arms which close the motor contacts 56. The result is that the contacts 236 are always open at such times when motor contacts 56 are closed.

Considering now the card receiver assembly 175, this unit is formed with a throat at the top through which the card is inserted. The throat is beveled so that the card readily seeks the slot. A pair of vertical guides 237 and 238 (Fig. 17) locate the card in an upright position just over the bell crank lever 195. To the rear of these guides is attached the carriage which rides back and forth on a stationary bar 240. The carriage is split into two plates 177 and 174 (Fig. 17) so that the card receiver may be moved back to the right as well as further to the left manually to some desired out-of-program position. This movement is against the action of a spring 173 (Figs. 21, 22, 23) so that upon release of the card carriage it returns to its normal in-program position.

In order to accomplish out-of-program printing it is necessary to insert a key in the key hole 244 on the left side of the machine cover 245 (Fig. 1) and turn the same to effect of rocking a bell crank 246 counterclockwise as viewed in Fig. 24 so as to carry a bar 247 with it. This bar is connected to the top of bell crank 246 and extends horizontally across the width of the machine to be supported by a cam surface 248 forming a portion of the right side frame of the machine. The action of the cam surface on the bar 247 causes the latter to rise as it is carried to the left by bell crank 246.

The effect of raising the bar 247 may be explained by a description of further mechanism associated with the carriage which will now be set forth. On the left side of the carriage assembly is pivotally mounted a lever 171 which is permitted to rock slightly clockwise as shown in Fig. 23 under the urging of a spring 167 whenever the carriage is manually extended to an out-of-program position to the right. The right side of the carriage pivotally carries a lever 172 which is rocked counterclockwise by spring 167 as shown in Fig. 22 when the carriage is manually extended to an out-of-program position to the left. The levers 171 and 172 are maintained in the position shown in Fig. 21 when the carriage remains in a normal in-program position because of the fact that spring 173 is stronger than the spring 167. The spring 173 urges the right side of plate 177 against the right extremity of an arm 171a of the lever 171 tending to urge the lever to the left. The movement to the left of plate 177 and hence of lever 171 is limited by the left side of 177 encountering the left side of plate 174. The lever 172 is held biased in a clockwise direction by the spring 173 which urges plate 174 to the right so that stud 149 rests firmly against the carriage shift lever 143 holding the lever 172 normally positioned as shown in Fig. 21. The levers 171 and 172 extend out so as to lie over a bail 166 as may be clearly seen from the sectional views of the carriage assembly shown in Figs. 19 and 20. Bail 166 is displaced to the right, as viewed in these figures, immediately upon the manual shifting of the carriage assembly in either direction. The movement of the bail 166 is effected by a stud 251 (Fig. 24) moving out of a notch in a notched plate 250 which is fastened to the card receiver. The notches are so disposed as to provide means for centering the printing positions on the card opposite the type wheels. When the plate 250 is shifted so that stud 251 is moved out of a notch an arm 252 is cammed down rocking shaft 192 to which the bail 166 is attached and moving bail 166 toward the rear of the machine or toward the right as viewed in Figs. 19 and 20. The movement imparted to bail 166 is against the action of a return spring 253 and is sufficient to move the bail clear of the ends of levers 171 and 172. Now one of these levers is operated when the carriage assembly is extended in either direction in a manner previously explained so that the end of the lever 171 or 172, as the case may be, drops down behind bail 166 and holds it in its operated position. For this reason, even though the card receiver is moved into another printing position the stud 251 is not normally allowed to seat in a notch in the plate 250. When the bail 166 is operated shaft 192 is rocked as previously explained and an arm 193 (Fig. 25) attached to the right extremity of this shaft is moved counterclockwise so as to operate a bell crank 194 and open the print interlock contacts 236 to prevent a print operation. Thus, it is seen that although the card receiver may be manually shifted in either direction at all times, the printing operation is normally rendered ineffective in out-of-program positions.

However, it will be noted that the bar 247 is positioned under the levers 171 and 172 and when this bar is raised in the manner already described, the levers 171 and 172 are prevented from moving down behind the bail 166 upon the manual shifting of the card receiver. Therefore when the card receiver is aligned with some out-of-program printing position the stud 251 seats in a notch in plate 250 and the lever 193 is moved back to normal allowing bell crank 194 to restore contacts 236 to their normally closed position to permit a printing operation to take place in the usual manner.

The ribbon spacing mechanism, which becomes operative immediately after a printing operation, is shown in Figs. 16 and 26. The ribbon 185 is wound on spools 190 and 190a which are positioned so as to operate in the usual manner, one spool to unwind as the other winds. The rocking of the hammer shaft 215 (Fig. 9) by the action of cam 231 on arm 230 to re-cock the hammer after it has been tripped causes an arm 254 (Fig. 2) which is fixed to shaft 215 to be moved first toward the rear of the machine or toward the right as viewed in Fig. 26. A stud 253 moves the lower end of an arm 255 to the right. The upper end of lever 255 is connected by a spring 256 to an arm 257 which is positioned by the pivot shaft 258 and also by a slot in the end of a member 259 in which a stud 260 on the arm 257 is seated. Member 259 is secured to the right end of the pivot shaft 258 and a similar member 261 is fastened to the other end but is inverted in its position. The mechanism is thus arranged so that movement of the lower part of lever 255 to the right causes a ribbon feed arm 262 connected to the member 259 to move to the left and at the same time also causes another ribbon feed arm 263 to move to the right. Referring to Fig. 16, it is seen that the ends of the arms 262 and 263 are bifurcated and cooperate with ribbon spool ratchets 264 and 265 respectively. However, due to the toggle mechanism construction shown in Fig. 26, only one of the two arms 262 and 263 is permitted to extend outwardly far enough to reach its corresponding ribbon spool ratchet. This is determined by the slot in the member 259 in which the stud 260 is seated. When this stud is in the forward slot and arm 254 is operated, the arm 262 moves toward the front to feed the ribbon spool ratchet 264 ahead one tooth by the engaging of the projection 262a with this ratchet. At the same time arm 263 is being moved toward the rear of the machine away from its ratchet 265. On the return stroke of arm 254, the movement of the arms 262 and 263 is reversed for each, the arm 262 moving away from its ratchet 264 and the arm 263 moving toward its ratchet 265. However, with the stud 260 seated in the forward slot the arm 263 never moves out far enough to engage ratchet 265.

Reversing mechanism for the ribbon is provided and has the effect of throwing the toggle mechanism so that the stud 260 moves out of the slot of member 259 in which it is positioned and into the other slot in this member so that whichever of the arms 262 or 263 that was causing the ribbon spacing would be pulled back out of the way and the other arm moved into an operating relationship with its ratchet. The sensing mechanism to determine when the ribbon has been fed far enough in one direction comprises a pawl member 266 associated with the ribbon spool 190 and a similar pawl member 267 associated with the ribbon spool 190a. In Fig. 26 the pawl member 266 is shown in an operative position due to the fact that the ribbon is low on the spool 190 and an arm 266a on the pawl member has moved in following the ribbon under the urging of a flat spring 268 attached to this pawl member 266 and a pawl 266b has consequently been permitted to move out and engage behind a projection 263b on the arm 263. Thus, when arm 263 attempts to pursue its normal rearward travel it is prevented in so doing by the pawl 266b and this results in the toggle mechanism being thrown so that the stud 260 is seated in the other slot of member 259. Consequently, the arm 263 becomes operative to feed the ratchet 265 and wind the ribbon in the reverse direction upon further printing operations. It will be noted that the ribbon reversing mechanism as set forth is operated by drive mechanism and does not rely on a button on the ribbon or other similar means. Thus the wear on the ribbon is considerably reduced.

Figure 1:
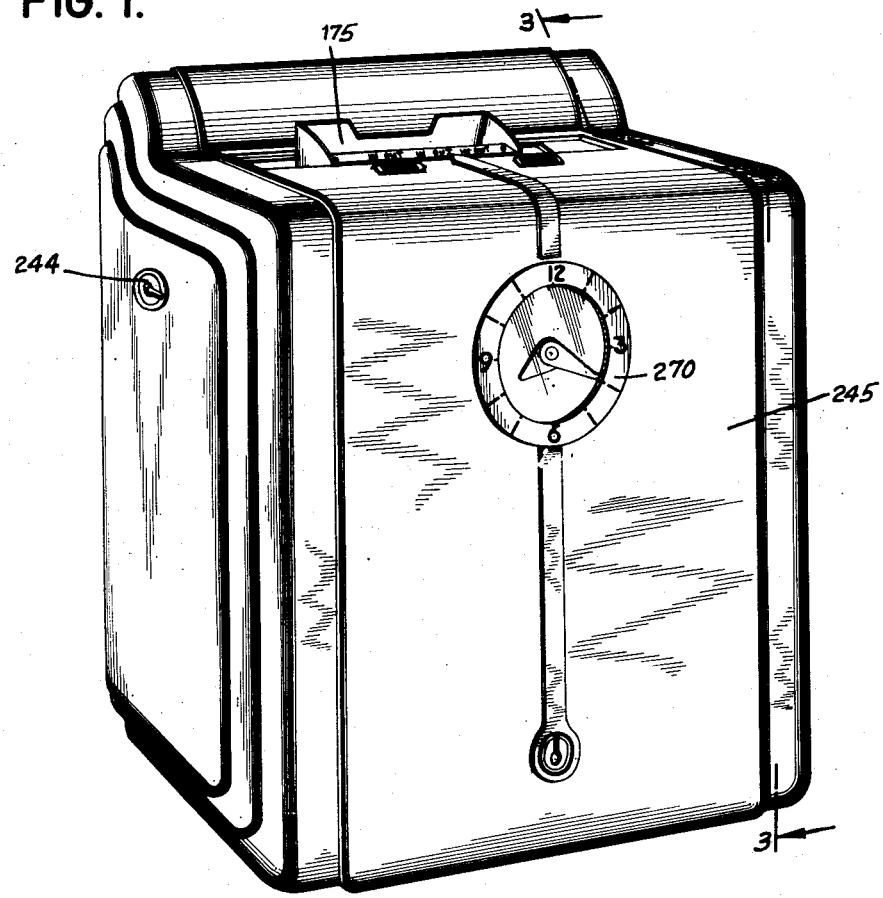

A clock 270 is provided on the face of the machine as shown in Fig. 1, so that the operator has visible evidence of the time before he makes his registration. The clock mechanism is driven from a large gear 272 (Fig. 30) which is fixed to the type wheel shaft 100 so that upon each advance of the minute type wheel the gear 272 is advanced to drive a pinion 273 on a shaft 274. The shaft 274 is extended through a bushing 275 and has a gear 276 (Fig. 5) on its forward extremity which drives the clock gearing generally designated 277 to advance the minute hand of the clock 270 in a manner well known in the art.

Other information visible to the operator include a day indicating device 295 (Fig. 30) rotated by suitable gearing including gear 296 meshing with day type wheel 83 so that the correct day indication appears in a window on the top left of the machine as shown in Fig. 1, a color indicating strip 189 the movement of which has already been described appearing in the right window on the top of the machine, and a registration classifying strip mounted at the top front of the card receiver and provided with the symbols "In", "Out", etc. simply to represent the purpose of this strip in indicating the lateral position of the card receiver. This latter strip is useful in out-of-program printing to align the card receiver with a desired out-of-program position. If day-to-day positions rather than daily recordings are to be horizontally displaced across the card then, obviously, the indications on this strip must be changed accordingly.

The various simple circuits of the machine are shown in the wiring diagram (Fig. 2) which will now be described. A source of power (not shown) is connected to the line terminals 280 and 281 and lines from a master clock (not shown) are connected to terminals A, B and C. The circuit which normally energizes the solenoid 40 may be traced from terminal A, conductor 282, normally closed contacts 283, conductor 285, solenoid 40 to terminal C. The master clock sends an impulse over this circuit once each minute to energize solenoid 40. Contacts 283 together with a companion pair of contacts 284 constitute a method of self-regulating time control in conjunction with the master clock which is familiar in the art. On the fifty-ninth minute of each hour a cam 286 on the gear 101 (Fig. 3) causes contacts 283 to open and contacts 284 to close. Thus, the previously traced circuit to the solenoid 40 is broken and another circuit to this solenoid established as follows: terminal B, conductor 287, contacts 284 now closed, conductor 285, solenoid 40, to terminal C. Secondary units which have not reached the fifty-ninth minute will remain in the original circuit and rapidly occurring pulses are sent to this circuit from the master clock in a manner well known in the art to step these units ahead. As a unit reaches the fifty-ninth minute, it drops out of the original circuit and into another circuit as described above. Should the recorder clock be fast, then it drops out of the original circuit on the fifty-ninth minute and further impulses from the master clock are ineffective to operate solenoid 40 until the master clock catches up and sends minute impulses out over the correction circuit through contacts 284. The correction circuit is broken shortly after the hour and the original circuit re-established by the closing of contacts 283.

The energization of solenoid 40 effects the closing of motor contacts 56 in a manner already described so as to complete a circuit through the motor 60 as follows: terminal 280, conductor 288, motor contacts 56, motor 60, conductor 289 to terminal 281. The motor 60 then advances the recording mechanism one minute and coasts to a stop upon the opening of contacts 56 as previously described.

When a time card has been inserted properly for a printing operation to occur contacts 200 are closed completing a circuit through the print control solenoid 205 as follows: terminal 280, conductor 288, contacts 236, solenoid 205, contacts 200 now closed, to terminal 281. Then, soon after solenoid 205 is energized it becomes deenergized by the opening of contacts 236. Contacts 56 now become closed to complete motor circuit to operate the motor 60 and restore the print mechanism which was released by the solenoid 205.

The bell ringing circuit is operated from the same source of supply as the motor 60. The circuit includes contacts 168 which are operated by the programming mechanism and contacts 169 which are closed by a stud on arm 44 (Fig. 3). Contacts 168, upon closing, are held closed for the duration of a minute, that is, until the programming mechanism is advanced again. Contacts 169 remain closed only for the duration of the impulse from the master clock. The circuit may be traced from terminal 280, conductor 290, contacts 168 now closed, contacts 169 now closed, conductor 291, terminal 292, to a bell (not shown) terminal 293, and back to terminal 281.

If a synchronous motor SM is to be used in place of the solenoid 40 and master clock control this motor is connected directly across the terminals 280 and 281. Obviously, the circuits from terminals A, B, and C will not be used when the synchronous motor is employed.

It is seen, then, that the operation of the machine is briefly as follows: the tripping of a clutching means and the operation of a drive motor occur once each minute to advance the recording and programming mechanism a distance equivalent to one minute. These operations are initiated either by impulses from a master clock which energizes an electromagnet or by a synchronous motor or other convenient timing means. A program device is provided comprising a program drum adapted to receive control elements and having mechanism associated therewith to be operated by said control elements to control such program operations as the horizontal and vertical shifting of the card receiver, ribbon color changing, and bell ringing. Printing is automatic and occurs when the print control mechanism is tripped off by the proper insertion of a time card. The fact that the card must be inserted the proper distance in the receiver before printing may occur insures registration of the time in the correct position of the card. Normally the printing operation is rendered ineffective by movement of the card carriage to an out-of-program position, however, if an out-of-program print controller is operated, printing in an out-of-program position may be effected and upon release of the card receiver it automatically returns to its normal in-program position.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A program device for scheduling the operations of associated mechanisms over a predetermined period of time comprising a rotatable drum containing a plurality of equally spaced slots in its lateral surface, means for rotating said drum about its axis in time sequence to bring said slots successively into predetermined positions, means for axially displacing said drum at regular intervals during said period, detachably secured inserts in said slots and projecting therefrom, and fingers, cooperative with said mechanisms, contacting the projecting parts of said inserts at said predetermined positions for controlling the operations of said mechanisms according to schedule.

2. A device for governing the operations of associated mechanisms according to a prearranged schedule over a predetermined period of time comprising a rotatable drum containing a plurality of spaced circumferential bands, each said band having a plurality of equally spaced slots, the latter disposed in the lateral surface of said drum, a plurality of detachably secured inserts in some of said slots, means for rotating said drum chronometrically about its axis to present said inserts of any said band successively to a predetermined position, means for shifting said drum axially at predetermined times during such period, and members from each said mechanism, for controlling the operations of the latter, suitably disposed at said position to contact the said inserts as they are presented successively to the said position.

3. A program device for scheduling the operations of associated mechanisms over a predetermined period of time comprising a rotatable drum having a plurality of slots in its lateral surface equally spaced and disposed in spaced circumferential bands, said slots being oriented lengthwise of the axis of rotation of said drum, detachably fastened inserts in said slots, each said insert having a plurality of equal projecting ears, means for rotating said drum in time synchronism to bring said inserts successively to a predetermined position, elements contacting said ears at said position for controlling the operations of the associated mechanisms, means for axially displacing said drum a predetermined amount after each revolution of said drum during said period to present a different ear of any said insert to a said contacting element after each revolution of said drum, and means for restoring said drum axially to its original position at the termination of such period.

4. In a program device comprising a clock rotated drum containing in its lateral surface a plurality of equally spaced circumferential bands of equally spaced slots, each of said slots disposed with its length parallel with the axis of said drum, a plurality of program effecting elements disposed in a predetermined lineal location adjacent the lateral surface of said drum, and a plurality of U-shaped semi-resilient inserts detachably secured in said slots projecting radially from said drum for contacting said elements, each of said inserts having its projecting portions divided into a plurality of equal parts any one of which may be readily broken from said insert when not desired to be contacted by one of said elements.

5. A program device for scheduling the operations of associated mechanisms over a predetermined period of time comprising a hollow rotatable drum having a plurality of holes cut through its lateral surface, inserts detachably secured in said holes, said drum having a lengthwise slot in its lateral surface extending substantially through its length, means for rotating said drum in time synchronism, a plurality of program effecting elements, at a predetermined position adjacent said drum, successively contacted by said inserts as the drum is rotated, and means to shift said drum axially each time said slot is presented to said position.

6. A program device for scheduling the operations of associated mechanisms over a predetermined period of time comprising a hollow rotatable drum having a lateral surface consisting of a materially thin sheet perforated with a series of equally spaced slots arranged in circumferential bands spaced one from the other, detachably secured inserts in said slots, said inserts being semi-resilient U-shaped members adapted to lock themselves into position in said slots, each of said inserts being provided with a plurality of radially projecting ears extending laterally along said drum's surface, means to rotate said drum in time sequence, a plurality of program effecting elements fixed at a predetermined position adjacent said drum whereby one of said elements is contacted by an ear of one of said inserts as said drum is rotated, and means to shift said drum axially after a revolution of the latter whereby said element is contacted a second time by an adjacent ear of said insert.

FREDERICK Q. RAST.